United States Patent
Tsai et al.

(10) Patent No.: US 8,625,693 B2
(45) Date of Patent: Jan. 7, 2014

(54) TECHNIQUES FOR TRANSFORMATION CODEBOOK ANTENNA BEAMFORMING IN OFDM WIRELESS COMMUNICATION SYSTEM

(75) Inventors: Jiann-An Tsai, Plano, TX (US); Zhouyue Pi, Richardson, TX (US); Sudhir Ramakrishna, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 12/912,080

(22) Filed: Oct. 26, 2010

(65) Prior Publication Data

US 2011/0110451 A1 May 12, 2011

Related U.S. Application Data

(60) Provisional application No. 61/280,670, filed on Nov. 6, 2009, provisional application No. 61/281,396, filed on Nov. 17, 2009, provisional application No. 61/292,755, filed on Jan. 6, 2010, provisional application No. 61/313,484, filed on Mar. 12, 2010, provisional application No. 61/328,459, filed on Apr. 27, 2010, provisional application No. 61/330,000, filed on Apr. 30, 2010.

(51) Int. Cl.
- *H04B 7/02* (2006.01)
- *H04L 27/00* (2006.01)
- *H04M 11/00* (2006.01)

(52) U.S. Cl.
USPC .......................... 375/267; 375/299; 455/403

(58) Field of Classification Search
USPC .................... 375/267, 299; 455/403
See application file for complete search history.

(56) References Cited

U.S. PATENT DOCUMENTS

| | | | |
|---|---|---|---|
| 6,330,459 B1 * | 12/2001 | Crichton et al. | 455/562.1 |
| 7,693,551 B2 * | 4/2010 | Ojard | 455/562.1 |
| 2005/0152473 A1 * | 7/2005 | Maltsev et al. | 375/299 |
| 2005/0287978 A1 * | 12/2005 | Maltsev et al. | 455/403 |
| 2006/0094373 A1 * | 5/2006 | Hottinen | 455/73 |
| 2007/0015543 A1 * | 1/2007 | Ojard | 455/562.1 |
| 2008/0014870 A1 * | 1/2008 | Kim | 455/69 |
| 2008/0123602 A1 * | 5/2008 | Beek et al. | 370/336 |
| 2009/0019150 A1 * | 1/2009 | Li et al. | 709/224 |
| 2009/0033555 A1 * | 2/2009 | Niu et al. | 342/372 |
| 2009/0160707 A1 * | 6/2009 | Lakkis | 342/367 |

FOREIGN PATENT DOCUMENTS

| | | |
|---|---|---|
| KR | 10-2006-0130806 A | 12/2006 |
| KR | 10-2007-0079788 A | 8/2007 |
| KR | 10-2008-0074419 A | 8/2008 |
| KR | 10-2008-0087211 A | 10/2008 |

* cited by examiner

*Primary Examiner* — Leon-Viet Nguyen
*Assistant Examiner* — Sarah Hassan
(74) *Attorney, Agent, or Firm* — Jefferson IP Law, LLP

(57) ABSTRACT

Methods for a transmitter station and a receiver station to perform beamforming in a wireless communication system, and a transmitter station and a receiver station to perform the corresponding method, are provided. The method for the transmitter station to perform beamforming in the wireless communication system includes estimating and tracking a long-term averaged and normalized channel correlation matrix between the transmitter station and a receiver station, determining beamforming coefficients based on the tracked long-term averaged and normalized channel correlation matrix, and communicating with the receiver station using the determined beamforming coefficients, wherein the receiver station also estimates and tracks the long term averaged and normalized channel correlation matrix, and determines beamforming coefficients based on the tracked long-term averaged and normalized channel correlation matrix.

28 Claims, 11 Drawing Sheets

TECHNIQUES FOR TRANSFORMATION CODEBOOK ANTENNA BEAMFORMING IN OFDM WIRELESS COMMUNICATION SYSTEM

CROSS-REFERENCE TO RELATED APPLICATIONS

This application claims the benefit under 35 U.S.C. §119 (e) of a U.S. Provisional application filed on Nov. 6, 2009 in the U.S. Patent and Trademark Office and assigned Ser. No. 61/280,670, U.S. Provisional application filed on Nov. 17, 2009 in the U.S. Patent and Trademark Office and assigned Ser. No. 61/281,396, U.S. Provisional application filed on Jan. 6, 2010 in the U.S. Patent and Trademark Office and assigned Ser. No. 61/292,755, U.S. Provisional application filed on Mar. 12, 2010 in the U.S. Patent and Trademark Office and assigned Ser. No. 61/313,484, U.S. Provisional application filed on Apr. 27, 2010 in the U.S. Patent and Trademark Office and assigned Ser. No. 61/328,459, and U.S. Provisional application filed on Apr. 30, 2010 in the U.S. Patent and Trademark Office and assigned Ser. No. 61/330,000, the entire disclosure of each of which is hereby incorporated by reference.

BACKGROUND OF THE INVENTION

1. Field of the Invention

Aspects of the present invention relate to antenna beamforming in an Orthogonal Frequency Division Multiplexing (OFDM) wireless communication system. More particularly, aspects of the present invention relate to transformation codebook antenna beamforming in an OFDM wireless communication system.

2. Description of the Related Art

Transmit beamforming may be performed in a wireless communication system in either a closed-loop or open-loop manner. Open-loop transmit beamforming is typically well suited for use in a Time Division Duplexing (TDD) system, which does not require channel information feedback. By not feeding back the channel information, less overhead is used. However, open-loop transmit beamforming has a disadvantage in that phase calibration should be constantly performed in order to compensate for the phase difference between transmission and reception of Radio Frequency (RF) chains among multiple transmit antennas. The process of phase calibration is generally costly, and sensitive to the radio channel environment.

In contrast, closed-loop transmit beamforming typically does not require phase calibration if channel sounding pilot signals (e.g., common pilot signals, midambles, and preambles) are also used for data demodulation. If channel sounding signals are not used for data demodulation, a dedicated pilot signal would be needed for data demodulation. In this case, a phase calibration would still be needed for closed-loop transmit beamforming in a Frequency Division Duplexing (FDD) system. It is noted that closed-loop transmit beamforming requires the feedback of channel information to the transmitter. By feeding back the channel information, more overhead is used. In addition, closed-loop transmit beamforming is also sensitive to feedback channel error due to feedback delay or fast channel variation. Typically, an FDD system employs the closed-loop transmit beamforming scheme. It is noted that a closed-loop scheme can also be applied to TDD systems.

A practical closed-loop transmit beamforming scheme is typically based on a codebook design. The closed-loop codebook-based transmit beamforming can be used for a scenario where a base station forms a transmit antenna beam toward a single user (or a mobile station) or simultaneously toward multiple users (or multiple mobile stations) at a certain time and at a certain frequency. A codebook is a set of pre-determined antenna beams that are known to mobile stations. It has been known that a codebook based pre-coding Multiple-Input and Multiple-Output (MIMO) can provide significant spectral efficiency gain in the downlink of a system implementing closed-loop MIMO. In the Institute of Electrical and Electronics Engineers (IEEE) 802.16e and $3^{rd}$ Generation Partnership Project (3GPP) Long Term Evolution (LTE) standards, a 4 Transmit (TX) antenna limited feedback based closed-loop MIMO configuration is supported. Nowadays, in the IEEE 802.16m and 3GPP LTE Advanced standards, in order to provide peak spectral efficiency, an 8 TX antenna configuration is proposed as a prominent closed-loop MIMO downlink system.

To eliminate the need of phase calibration in a case where channel sounding signals or common pilot signals (e.g., common pilot signals, midambles, and preambles) are not used for data demodulation, a closed-loop transformed codebook based transmit beamforming has been proposed. The transformation codebook utilizes the channel correlation information for two folds, namely to modify a fixed codebook (or a base codebook) to enhance antenna beamforming performance in highly correlated wireless channels and to remove the need of antenna phase calibration for multiple transmit antenna systems. Typically, the channel correlation information described above is based on second order statistics of a channel correlation matrix and can be fed back from a receiver to a transmitter when closed-loop transmit beamforming. Typically, the channel correlation information changes very slowly, which is similar to a long term channel effect, such as the shadowing and path loss. Thus the feedback overhead and computation complexity from correlation information is very small.

Therefore, a need exists for techniques for transformation codebook antenna beamforming in a wireless communication system.

SUMMARY OF THE INVENTION

An aspect of the present invention is to address at least the above-mentioned problems and/or disadvantages and to provide at least the advantages described below. Accordingly, an aspect of the present invention is to provide techniques for transformation codebook antenna beamforming in an Orthogonal Frequency Division Multiplexing (OFDM) wireless communication system.

In accordance with an aspect of the present invention, a method for a transmitter station to perform beamforming in a wireless communication system is provided. The method includes estimating and tracking a long-term averaged and normalized channel correlation matrix between the transmitter station and a receiver station, determining beamforming coefficients based on the tracked long-term averaged and normalized channel correlation matrix, and communicating with the receiver station using the determined beamforming coefficients, wherein the receiver station also estimates and tracks the long term averaged and normalized channel correlation matrix, and determines beamforming coefficients based on the tracked long-term averaged and normalized channel correlation matrix.

In accordance with another aspect of the present invention, a method for a receiver station to perform beamforming in a wireless communication system is provided. The method includes estimating and tracking a long-term averaged and normalized channel correlation matrix between the receiver station and a transmitter station, determining beamforming coefficients based on the tracked long-term averaged and normalized channel correlation matrix, and communicating with the transmitter station using the determined beamforming coefficients, wherein the transmitter station also estimates and tracks the long term averaged and normalized channel correlation matrix, and determines beamforming coefficients based on the tracked long-term averaged and normalized channel correlation matrix.

In accordance with yet another aspect of the present invention, a transmitter station for performing beamforming in a wireless communication system is provided. The transmitter station includes a receiver for receiving signals from a receiver station based on beamforming coefficients, a transmitter for transmitting signals to the receiver station based on beamforming coefficients, and a controller for estimating and tracking a long-term averaged and normalized channel correlation matrix between the transmitter station and the receiver station, for determining beamforming coefficients based on the tracked long-term averaged and normalized channel correlation matrix, for controlling the receiver to receive signals from the receiver station using the determined beamforming coefficients, and for controlling the transmitter to transmit signals to the receiver station using the determined beamforming coefficients, wherein the receiver station also estimates and tracks the long term averaged and normalized channel correlation matrix, and determines beamforming coefficients based on the tracked long-term averaged and normalized channel correlation matrix.

In accordance with still another aspect of the present invention, a receiver station for performing beamforming in a wireless communication system is provided. The receiver station includes a receiver for receiving signals from a transmitter station based on beamforming coefficients, a transmitter for transmitting signals to the transmitter station based on beamforming coefficients, and a controller for estimating and tracking a long-term averaged and normalized channel correlation matrix between the receiver station and the transmitter station, for determining beamforming coefficients based on the tracked long-term averaged and normalized channel correlation matrix, for controlling the receiver to receive signals from the transmitter station using the determined beamforming coefficients, and for controlling the transmitter to transmit signals to the transmitter station using the determined beamforming coefficients, wherein the transmitter station also estimates and tracks the long term averaged and normalized channel correlation matrix, and determines beamforming coefficients based on the tracked long-term averaged and normalized channel correlation matrix.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
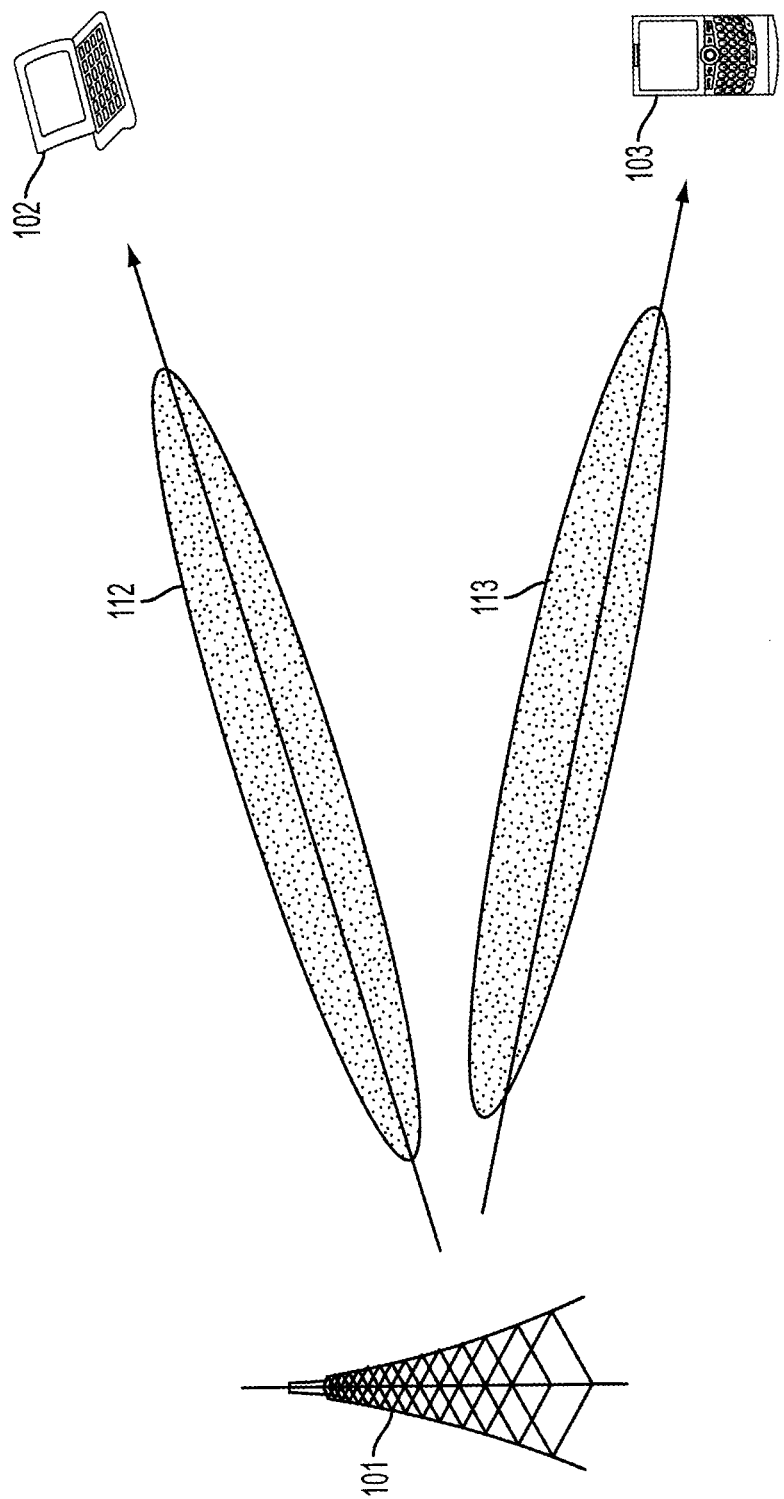
FIG. 1 illustrates beamforming in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to techniques for closed-loop transformation-codebook based transmit beamforming in an Orthogonal Frequency Division Multiplexing (OFDM) wireless communication system. More specifically, exemplary embodiments of the present invention described below relate to techniques for control signaling for closed-loop transformation-codebook based transmit beamforming in an OFDM wireless communication system.

It should be understood that the following description might refer to terms utilized in various standards merely for simplicity of explanation. For example, the following description may refer to terms utilized in the Institute of Electrical and Electronics Engineers (IEEE) 802.16e standard, IEEE 802.16m standard, $3^{rd}$ Generation Partnership Project (3GPP) Long Term Evolution (LTE) standard, or 3GPP LTE Advanced standard. However, this description should not be interpreted as being limited to the IEEE 802.16e, IEEE 802.16m, 3GPP LTE or 3GPP LTE Advanced standards. Independent of the mechanism used for closed-loop transformation-codebook based transmit beamforming, it is preferable to implement closed-loop transformation-codebook based transmit beamforming and it is advantageous for that ability to conform to a standardized mechanism.

Hereafter, the terms "transmitter," "base station," and advanced base station may be interchangeably used. Likewise, the terms "receiver," "mobile station," and advanced mobile station may be interchangeably used.

An example of beamforming in a wireless communication system is described below with reference to FIG. 1.

FIG. 1 illustrates beamforming in a wireless communication system according to an exemplary embodiment of the present invention.

Referring to FIG. 1, a base station 101 communicates with a mobile station 102 and a mobile station 103. To communicate with the mobile station 102 and the mobile station 103, the base station 101 simultaneously forms multiple antenna beams, antenna beam 112 for the mobile station 102 and antenna beam 113 for the mobile station 103, at a scheduled resource unit (e.g., frequency, time, or both). Although not shown in FIG. 1, the base station 101 may alternatively form a single antenna beam for both the mobile station 102 and the mobile station 103 at a scheduled resource unit (e.g., frequency, time, or both). Herein, the mobile station 102 and the mobile station 103 may be any of a Personal Digital Assistant (PDA), a laptop, a handheld device, etc.

It is noted that, in a wireless communication system, communication from a base station to a mobile station may be referred to as a DownLink (DL) communication. In addition, the radio wave signal may employ an OFDM scheme. Also, the base station and mobile stations may each employ multiple antennas for transmission and reception of radio wave signals to improve the capacity and reliability of a wireless communication channel.

A system implementing multiple transmit antennas and multiple receive antennas at a base station and at mobile stations to improve the capacity and reliability of a wireless communication channel is referred to as Multiple-Input and Multiple-Output (MIMO) system. A MIMO system may bring up to a linear increase in capacity with K where K is the minimum of number of transmit antennas M and receive antennas N, i.e., K=min(M, N). MIMO may be implemented with one or more MIMO modes such as spatial multiplexing, transmit/receive beamforming, and transmit/receive diversity. An example of spatial multiplexing in a 4×4 MIMO system is described below with reference to FIG. 2.

Figure 2:
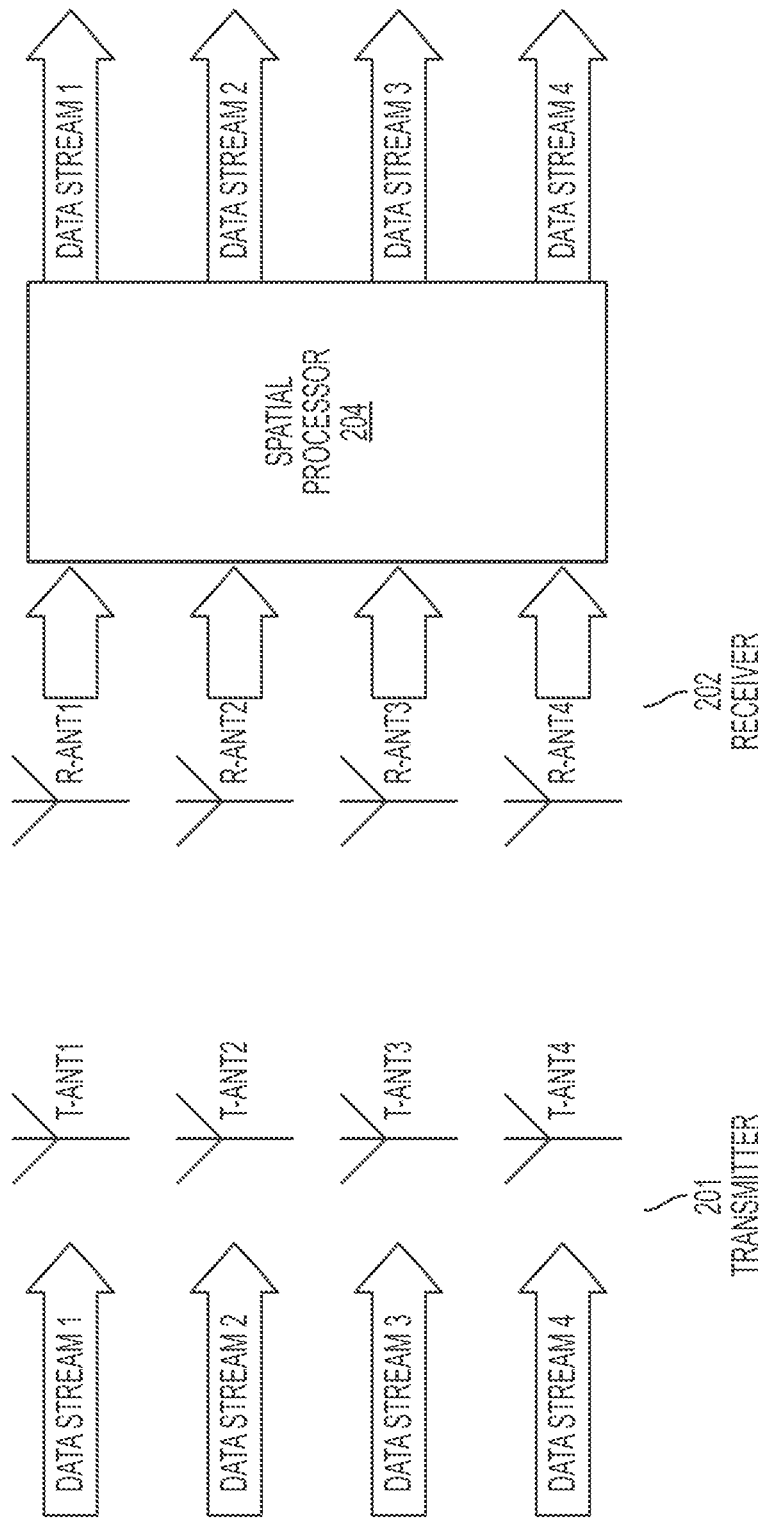
FIG. 2 illustrates spatial multiplexing in a 4×4 Multiple-Input and Multiple-Output (MIMO) system according to an exemplary embodiment of the present invention.

FIG. 2 illustrates spatial multiplexing in a 4×4 MIMO system according to an exemplary embodiment of the present invention.

Referring to FIG. 2, four different data streams Data Stream 1, Data Stream 2, Data Stream 3, and Data Stream 4 are transmitted separately from a transmitter 201 via four transmit antennas T-Ant1, T-Ant2, T-Ant3, and T-Ant4. The transmitted signals are received at four receive antennas R-Ant-1, R-Ant2, R-Ant3, and R-Ant4 of receiver 202. Spatial signal processing is performed by a spatial processor 204 on the received signals in order to recover the four data streams Data Stream 1, Data Stream 2, Data Stream 3, and Data Stream 4. An example of spatial signal processing is Vertical-Bell Laboratories Layered Space-Time (V-BLAST), which uses the successive interference cancellation principle to recover the transmitted data streams. Other variants of MIMO schemes include schemes that perform some type of space-time coding across the transmit antennas (e.g., Diagonal Bell Laboratories Layered Space-Time Architecture (D-BLAST)). In addition, MIMO may be implemented with a transmit/receive diversity scheme and a transmit/receive beamforming scheme to improve the link reliability or system capacity in wireless communication systems.

MIMO channel estimation consists of estimating the channel gain and phase information for links from each of the transmit antennas to each of the receive antennas. Therefore, the channel for a MIMO system consists of an N×M matrix:

$$H = \begin{bmatrix} a_{11} & a_{12} & \ldots & a_{1M} \\ a_{21} & a_{22} & \ldots & a_{2M} \\ \vdots & \vdots & \ldots & \vdots \\ a_{N1} & a_{M2} & \ldots & a_{NM} \end{bmatrix}$$

where $\alpha_{ij}$ represents the channel gain from a transmit antenna j to a receive antenna i. In order to enable the estimations of the elements of the MIMO channel matrix, separate pilots are transmitted from each of the transmit antennas.

One variant of the MIMO schemes is Single-User Beam-Forming (SU-BF), where a base station with multiple transmit antennas may communicate with a single mobile station. An example of an SU-BF operation in a wireless communication system is described below with reference to FIG. 3.

Figure 3:
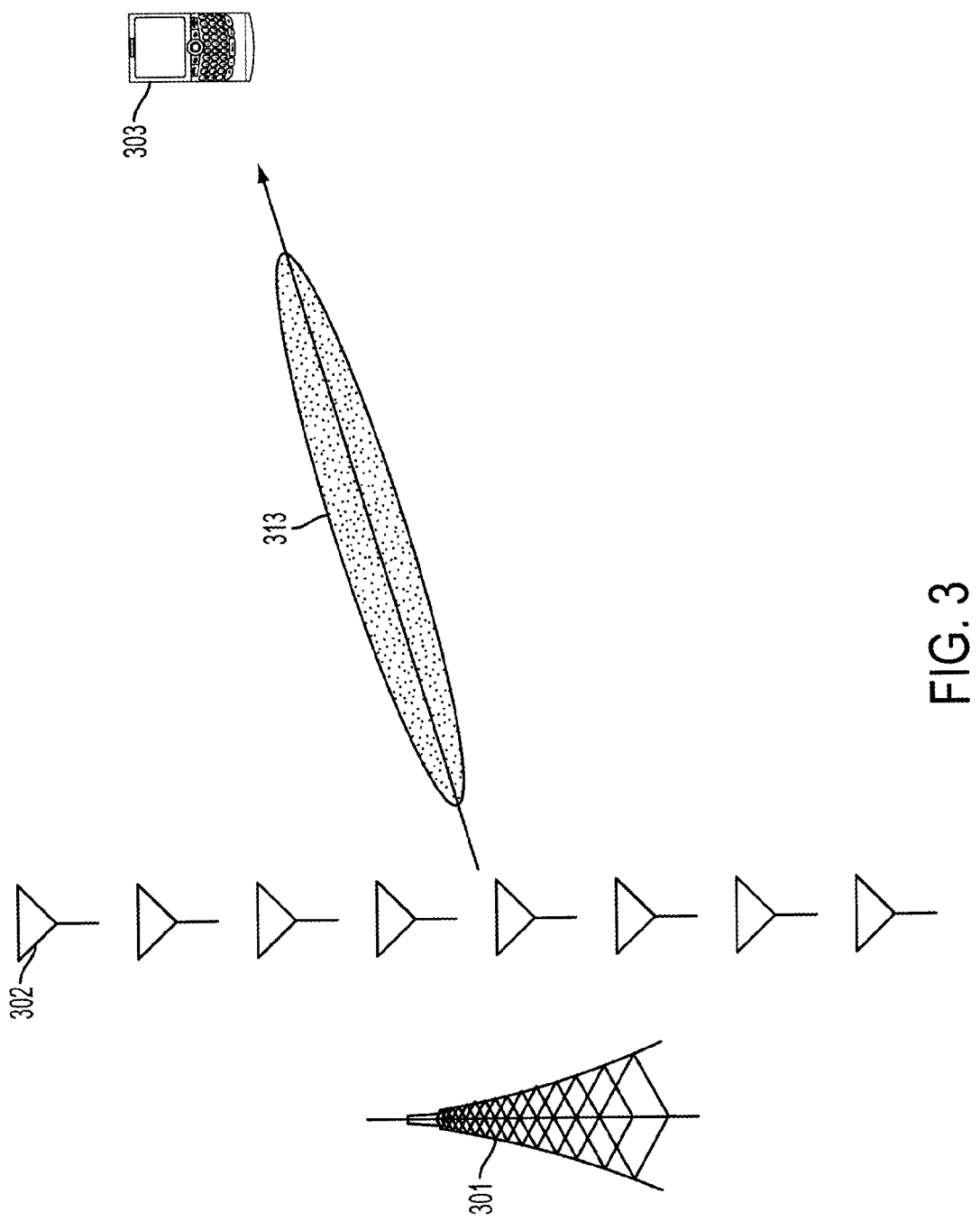
FIG. 3 illustrates a Single-User BeamForming (SU-BF) operation in a wireless communication system according to an exemplary embodiment of the present invention.

FIG. 3 illustrates an SU-BF operation in a wireless communication system according to an exemplary embodiment of the present invention.

Referring to FIG. 3, a base station 301 is equipped with 8 transmit antenna system 302, which is used to form a single antenna 313 beam to a mobile station 303. A single data stream is conveyed using the SU-BF operation to the mobile station 303.

Another variant of the MIMO schemes is Multiple-User Beamforming (MU-BF), where a base station with multiple transmit antennas can simultaneously communicate with multiple mobile stations through the use of multi-user beamforming schemes such as Spatial Division Multiple Access (SDMA) to improve the capacity and reliability of a wireless communication channel. An example of a SDMA scheme is a 4-user SDMA system where a base station is equipped with 8 transmit antennas and four mobile stations are each equipped with two antennas. The 4-user SDMA system is described in more detail below with reference to FIG. 4.

Figure 4:
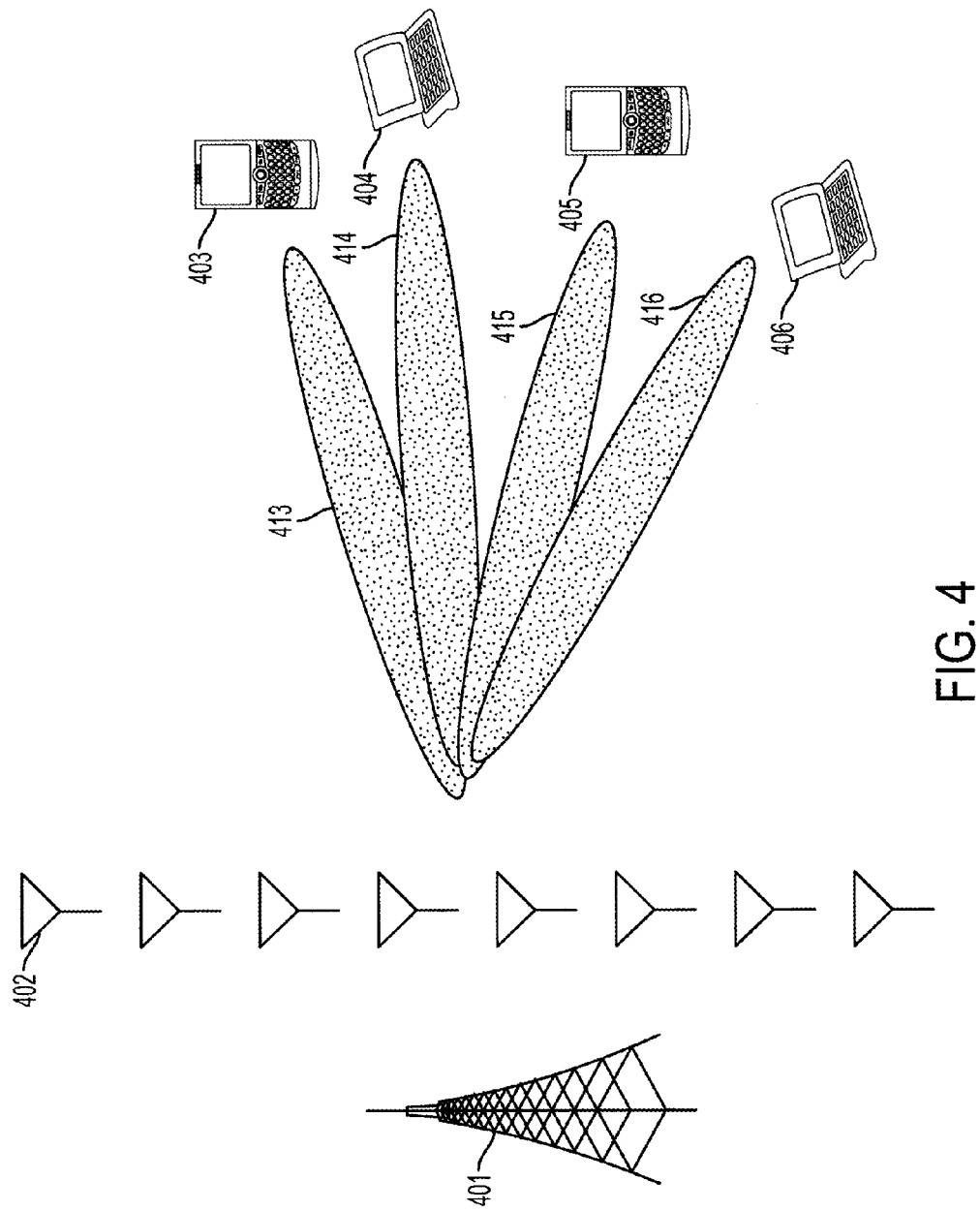
FIG. 4 illustrates a 4-user Spatial Division multiple Access (SDMA) system according to an exemplary embodiment of the present invention.

FIG. 4 illustrates a 4-user SDMA system according to an exemplary embodiment of the present invention.

Referring to FIG. 4, 4 transmit antenna beams 413, 414, 415, and 416 may be formed at a base station 401 via an eight transmit antenna system 402. Each antenna beam conveys a single data stream. The 4 data streams may be simultaneously scheduled for multiple mobile stations, namely a mobile station 403, a mobile station 404, a mobile station 405, and a mobile station 406. Here, each mobile station is receiving a single stream. However, each mobile station may potentially receive multiple data streams, depending on the scheduler of the base station 401.

Herein, it is noted that exemplary embodiments of the present invention apply to both SU-BF and MU-BF operations at both a transmitter and receivers.

Closed-Loop Transformed-Codebook Based Transmit Beamforming (CL-TCTB)

Now, basic principles, aspects, features, and advantages of a CL-TCTB system in a wireless communication system according to exemplary embodiments of the present invention will be described. Closed-loop fixed codebook transmit beamforming has been employed in various wireless communication systems, such as a Worldwide Interoperability for Microwave Access (WiMAX) system, and a 3GPP LTE system. In a closed-loop codebook based beamforming system, a transmitter sends a pilot signal or a channel sounding signal to a receiver, and the receiver measures the channel information and calculates the best codeword within a codebook to best match the observed channel. The best codeword information can then be fed back to the transmitter. The transmitter then uses the best codeword information for transmit antenna beamforming. The downside of using a fixed codebook is two fold. First, the channel quantization error is inversely proportional to the size of the codebook. Thus, the smaller a codebook, the larger a quantization error. For example, if a codebook is designed for uncorrelated antenna wireless channels, such a codebook would not be optimal for correlated antenna wireless channels due to the limited codebook size. Second, a closed-loop fixed codebook based transmit beamforming would not work properly without phase calibration among transmit antennas in a scenario where channel sounding signals or common pilot signals (or midamble) are only used for channel quality estimation or the best codeword estimation, while a dedicated pilot signal is used separately for a data demodulation purpose.

To enhance the performance of a closed-loop fixed codebook transmit beamforming scheme with limited feedback as well as to eliminate the need of phase calibration, a transformed codebook based transmit beamforming scheme has been proposed. The idea of the transformed codebook method utilizes the long-term channel correlation matrix information to enhance the performance of the standard codebook, especially in the highly correlated channel, as well as to eliminate the need of phase calibration among multiple transmit antennas. Typically, the channel correlation matrix information is based on second order statistics and thus it changes very slowly, which is similar to long term channel effects, such as shadowing and path loss, thus feedback overhead and computation complexity of correlation information is very small.

For ease in explanation, exemplary embodiments of the present invention are described in the context of a single receive antenna being employed at a receiver and multiple transmit antennas being employed at transmitter. However, the present invention is not limited thereto as multiple receive antennas may be employed at the receiver. In the context of a wireless communication system, the receiver may be a mobile station or handheld device while the transmitter may a base station.

The received signal model at a mobile station may be expressed as:

$$y = H w_j s + n \qquad \text{Equation 1}$$

where
- y is a received vector.
- H is a channel matrix of size N by M. N is the number of receive antennas at a mobile station; M is the number of transmit antennas at a base station.
- n is the complex additive white Gaussian noise with variance $N_0$.
- s is a modulated signal.
- $w_j$ is a transmit precoding matrix of size M by L, where j is the reported transmit precoding indication and L is the number of beams.

The transmit channel covariance matrix, R, may be defined as:

$$R = E\{H^H H\} \qquad \text{Equation 2}$$

where $(*)^H$ is a Hermitian operation.

In the context of a OFDM-based wireless communication system, the transmit channel covariance matrix can be further defined as:

$$R_{ij} = E\{H_{ij}^H H_{ij}\} \qquad \text{Equation 3}$$

where $H_{ij}$, is a channel matrix at an i-th OFDM symbol and j-th subcarrier.

The long-term average transmit channel covariance matrix, $\hat{R}$, may be expressed as:

$$\hat{R} = \frac{1}{N_S N_F} \sum_{i=1}^{N_S} \sum_{j=1}^{N_F} H_{ij}^H H_{ij} \qquad \text{Equation 4}$$

where $N_S$ and $N_F$ are the number of OFDM symbols and the number of subcarriers, respectively, used over an average period. The long-term average transmit channel covariance matrix $\hat{R}$ is typically normalized to minimize the dynamic range of the channel covariance matrix, which is denoted as $\tilde{R}$. That is, $\tilde{R} = \hat{R}\text{norm}(\hat{R})$, where $\text{norm}(\hat{R})$ is the normalization operation on $\hat{R}$. Furthermore, the normalized $\tilde{R}$ is an M×M matrix and can be further expressed as:

$$\tilde{R} = \sum_{k=1}^{K} \lambda_k u_k u_k^H \qquad \text{Equation 5}$$

where
- K is a number of eigen-modes (or eigenvalues).
- $\lambda_k$ is an k-th eigenvalue and is sorted in descending order, namely, $\lambda_1$ is the largest eigenvalue and $\lambda_K$ is the smallest eigenvector.

To ensure transformed codebook based transmit beamforming works properly, the long-term average $\tilde{R}$ of Equation 4 or Equation 5 should be estimated or calculated at a receiver through the use of common pilot signals or a channel sounding signal from a transmitter. The information of $\tilde{R}$ estimated at the receiver is fed back to the transmitter. The transmitter uses the information of $\tilde{R}$ to transform the fixed codebook or the base codebook, which is known to both the transmitter and the receiver. Assuming the base codebook or the fixed codebook is P and the codebook size is D, $P = \{p_1, p_2, \ldots p_D\}$. Here, $p_j$ is the j-th precoding matrix within the base codebook. The transformed codebook W may be expressed as:

$$W = \tilde{R}P.$$ Equation 6

It is noted that $\tilde{R}$ is the long-term averaged and normalized channel correlation matrix as described the above. $W = \{w_1, w_2, w_3, \ldots w_D\}$ with $w_k$ being the k-th transmit precoding matrix. The transformed codebook W may be calculated at both a transmitter and a receiver. W is used by the transmitter for transmit beamforming and precoding. The transmit precoding matrix $w_j$ is derived from W in conjunction with the reported transmit precoding indication j. The reported transmit precoding indication j is calculated and estimated at the receiver and is also fed back to the transmitter. The reported transmit precoding indication j may be derived from:

$$j = \underset{k \leq D}{\arg\max} \|Hw_k\|.$$ Equation 7

It is noted that in the context of DL communications in a wireless communication system, the transmitter may be a base station and the receiver may be a mobile station. An example of the procedural operation of a CL-TCTB system is described below with reference to FIG. 5.

Figure 5:
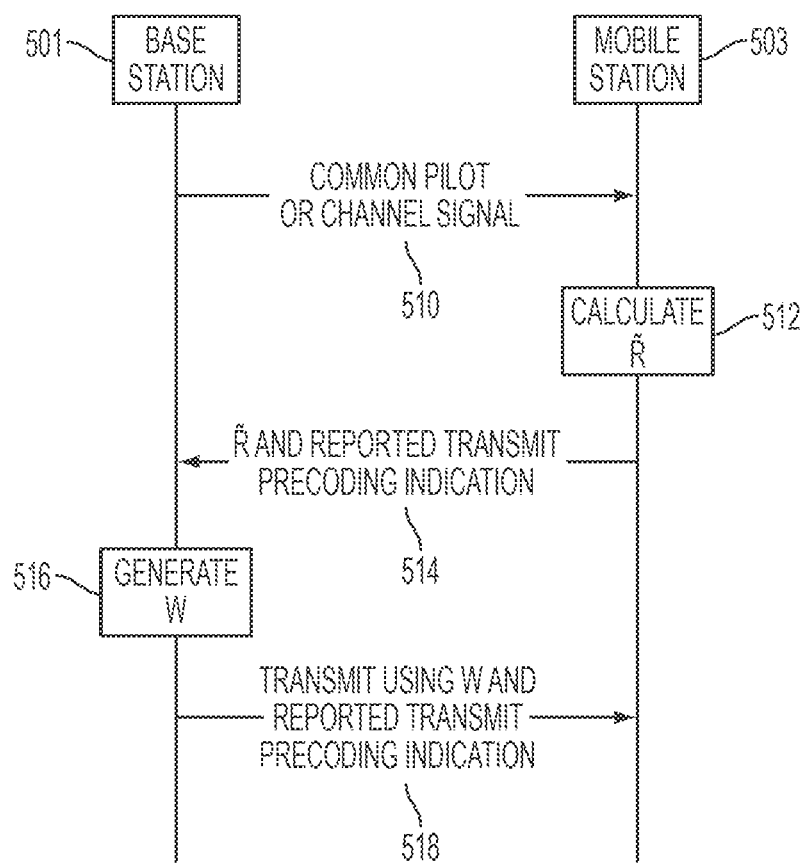
FIG. 5 illustrates a procedural operation of a Closed-Loop Transformed Codebook based Transmit Beamforming (CL-TCTB) system according to an exemplary embodiment of the present invention.

FIG. 5 illustrates a procedural operation of a CL-TCTB system according to an exemplary embodiment of the present invention.

Referring to FIG. 5, a base station 501 and a mobile station 503 are shown. Herein, the base station 501 may be equipped with 8 transmit antennas. In step 510, the base station 501 sends a common pilot signal or a channel sounding signal to the mobile station 503. In step 512, the mobile station 503 calculates $\tilde{R}$ using the received common pilot signal or the received channel sounding signal, and one of Equation 4 and Equation 5. In step 514, the mobile station 503 sends $\tilde{R}$ and the reported transmit precoding indication to the base station 501. In step 516, the base station 501 generates a transformed codebook W based on $\tilde{R}$. In step 518, the base station 501 uses W and the reported transmit precoding indication to perform transmit beamforming Operation of Tracking Based CL-TCTB at Base Station and Mobile Station A low feedback overhead scheme of a CL-TCTB system according to an exemplary embodiment of the present invention is described below. The low feedback overhead scheme according to an exemplary embodiment of the present invention is based on tracking methods of $\tilde{R}$, instead of direct reporting of $\tilde{R}$ back to a transmitter (or a base station in wireless communication system), as described above with reference to FIG. 5. The transmitter operation of tracking based CL-TCTB at a base station according to an exemplary embodiment of the present invention is described below.

A method of simultaneously tracking and estimating $\tilde{R}$ at both a base station and a mobile station according to an exemplary embodiment of the present invention, instead of a mobile station reporting the quantization version of $u_1$ or $u_1 \ldots u_K$, to a base station, is described below. The method of simultaneously tracking and estimating $\tilde{R}$ at both the base station and the mobile station utilizes information of a best reported antenna beam index or a reported Precoding Vector Index (PVI), which is derived at the mobile station. Another exemplary embodiment of the present invention includes a method of using a random matrix to enhance the tracking and estimating of $\tilde{R}$ of at both the base station and the mobile station. In this exemplary embodiment, the random matrix is known to both the base station and the mobile station. The method of generating a random matrix is based on the same random seed that is used at both the mobile station and the base station.

According to yet another exemplary embodiment of the present invention, the estimation of $\tilde{R}$, which is applied to a base codebook to form a transformation codebook W, is simultaneously tracked by a base station and a mobile station as function of at least one of a forgetting factor, a random factor, a Channel Quality Indication (CQI), a Signal to Interference plus Noise Ratio (SINR), and the reported transmit precoding indication j from a mobile station that is based on transformed codebook W using Equation 7. For example, $$\tilde{R} = f(\alpha, \beta, j, w_j, \gamma, v_{random})$$ Equation 8 where
- $\alpha$ is the forgetting factor, which is designed to track the mobility of a mobile channel.
- $\beta$ is the random factor, which is designed to avoid bias estimation of $\tilde{R}$.
- $\gamma$ is the parameter related to an SINR or a CQI value.
- $w_j$ is the transmit precoding matrix at a base station, which corresponds to or is a function of the reported transmit precoding indication from a mobile station, based on the transformed codebook.
- $v_{random}$ is a complex random matrix, which is simultaneously generated at both a base station and a mobile station in a synchronization manner. $v_{random}$ is designed to avoid a bias estimation of $\tilde{R}$.

According to another exemplary embodiment of the present invention, $\tilde{R}[t]$ at the time index t, which is applied to a base codebook to form a transformation codebook, may be specifically and simultaneously tracked and calculated at both a base station and mobile station as follows:

$$\tilde{R}[t] = \alpha \tilde{R}[t-1] + (1-\alpha)w_j[t]w_j^H[t]\gamma + \beta v_{random}[t]v_{random}^H[t]$$ Equation 9 where t=1, 2, 3 . . . is the updated tracking timing index. In a special case where $\gamma=1$, $\tilde{R}[t]$, which is applied to a base codebook to form a transformation codebook in Equation 9, may be simplified as:

$$\tilde{R}[t] = \alpha \tilde{R}[t-1](1-\alpha)w_j[t]w_j^H[t] + \beta v_{random}[t]v_{random}^H[t]$$ Equation 10

According to an alternative exemplary embodiment of the present invention, $\tilde{R}[t]$ at the time index t, which is applied to a base codebook to form a transformation codebook, may be specifically and simultaneously tracked and calculated at both a base station and mobile station as follows:

$$\tilde{R}[t] = (1-\alpha)\tilde{R}[t-1] + \alpha w_j[t]w_j^H[t]\gamma + \beta v_{random}[t]v_{random}^H[t]$$ Equation 11

In a special case where $\gamma=1$, $\tilde{R}[t]$, which is applied to a base codebook to form the transformation codebook in Equation 11, may be simplified as:

$$\tilde{R}[t] = (1-\alpha)\tilde{R}[t-1] + \alpha w_j[t]w_j^H[t] + \beta v_{random}[t]v_{random}^H[t]$$ Equation 12

According to another exemplary embodiment of the present invention, $\tilde{R}[t]$ in Equations 9, 10, 11, and 12 may be normalized before applying the base codebook P in order to generate the transform codebook W in Equation 6.

According to another exemplary embodiment of the present invention, the estimation of $\tilde{R}$, which is applied to a base codebook to form a transformation codebook, is simultaneously tracked by a base station and a mobile station as a function of at least one of a forgetting factor, a random factor, and reported transmit precoding indication i from a mobile station, which is based on a fixed or base codebook P using Equation 14. For example, $$\tilde{R} = f(\alpha, \beta i, p_i, \gamma, v_{random})$$ Equation 13 where the best antenna beam information i may be obtained by:

$$i = \underset{k \leq D}{\mathrm{argmax}} \|Hp_k\|$$ Equation 14 where $p_i$ is the transmit precoding matrix at a base station, which corresponds to or is a function of the reported transmit precoding indication from the mobile station, based on a fixed or base codebook P.

Base on Equation 12, in another exemplary embodiment of the present invention, $\tilde{R}[t]$ at the time index t, which is applied to a base codebook to form a transformation codebook, may be specifically and simultaneously tracked and calculated at both a base station and a mobile station as follows:

$$\tilde{R}[t] = \alpha \tilde{R}[t-1] + (1-\alpha) p_i[t] p_i^H[t] \gamma + \beta v_{random}[t] v_{random}^H[t].$$ Equation 15

In a special case where $\gamma=1$, $\tilde{R}[t]$, which is applied to a base codebook to form a transformation codebook in Equation 15, may be simplified as:

$$\tilde{R}[t] = \alpha \tilde{R}[t-1] + (1-\alpha) p_i[t] p_i^H[t] + \beta v_{random}[t] v_{random}^H[t].$$ Equation 16

In another exemplary embodiment of the present invention, $\tilde{R}[t]$ at the time index t, which is applied to a base codebook to form a transformation codebook, may be specifically and simultaneously tracked and calculated at both a base station and mobile station as follows:

$$\tilde{R}[t] = (1-\alpha) \tilde{R}[t-1] + \alpha p_i[t] p_i^H[t] \gamma + \beta v_{random}[t] v_{random}^H[t].$$ Equation 17

In a special case where $\gamma=1$, $\tilde{R}[t]$, which is applied to a base codebook to form a transformation codebook in Equation 17, may be simplified as:

$$\tilde{R}[t] = (1-\alpha) \tilde{R}[t-1] + \alpha p_i[t] p_i^H[t] + \beta v_{random}[t] v_{random}^H[t].$$ Equation 18

In another exemplary embodiment of the current invention, $\tilde{R}[t]$ in Equations 15, 16, 17, and 18 may be normalized before applying the base codebook P in order to generate the transform codebook W in Equation 6.

In another exemplary embodiment of the present invention, we propose that the updated period (cycle) of $p_i$, $w_j$, and $v_{random}$ in Equations 9, 10, 11, 12, 13, 15, 16, 17, and/or 18 may be the same or different.

The operation procedure of a CL-TCTB system with tracking based methods for $\tilde{R}[t]$ in the Equations 9, 10, 11, 12, 13, 15, 16, 17, and/or 18, which is simultaneously tracked at both a base station and a mobile station is described below with reference to FIG. 6.

Figure 6:
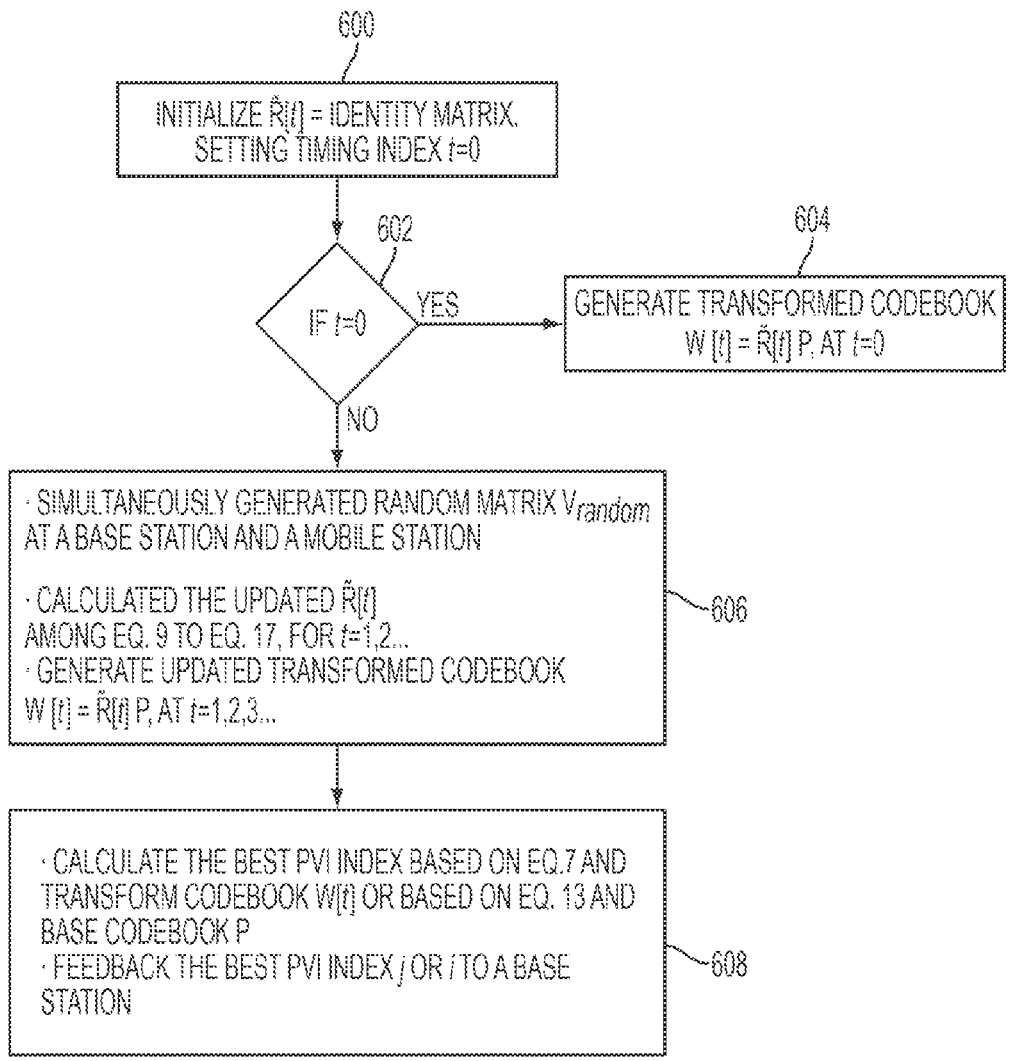
FIG. 6 is a flowchart for an operation of tracking based CL-TCTB at a base station and a mobile station according to an exemplary embodiment of the present invention.

FIG. 6 is a flowchart for an operation of tracking based CL-TCTB at a base station and a mobile station according to an exemplary embodiment of the present invention.

Referring to FIG. 6, in step 600, $\tilde{R}[t]$ is initialized, so that $\tilde{R}[t]$=identity matrix, and a timing index t is set, so that t=0. In step 602, it is determined if t=0. If it is determined that t=0, in step 604, the transformed codebook W[t] is generated using the base codebook P based on the equation W[t]=$\tilde{R}[t]$ P, at t=0. If it is not determined that t=0, in step 606, a random matrix $v_{random}$ is simultaneously generated at both a base station and a mobile station. Also in step 606, the updated $\tilde{R}[t]$ is calculated using one of Equations 9, 10, 11, 12, 15, 16, 17, or 18 for t=1, 2, . . . , etc. Also in step 606, the updated transformed codebook W[t] is generated based on the equation W[t]=$\tilde{R}[t]$ P, at t=1, 2, . . . , etc. In step 608, the best PVI index is calculated based on Equation 7 and transform codebook W[t], or is based on Equation 13 and base codebook P. Also in step 608, the best PVI feedback index j or i are fed back to the base station.

In another exemplary embodiment of the present invention, the initiation process of $\tilde{R}[t]$ in Equations 9, 10, 11, 12, 15, 16, 17, and 18 to enhance convergence speed of tracking based CL-TCTB at a base station may be improved. The improved initialization is based on the quantization version of $u_1$ or $u_1 \ldots u_K$. The operation procedure of a tracking based CL-TCTB with improved initialization of $\tilde{R}[t]$, that is $\tilde{R}[t=0]$, at a base station is described below with reference to FIG. 7.

Figure 7:
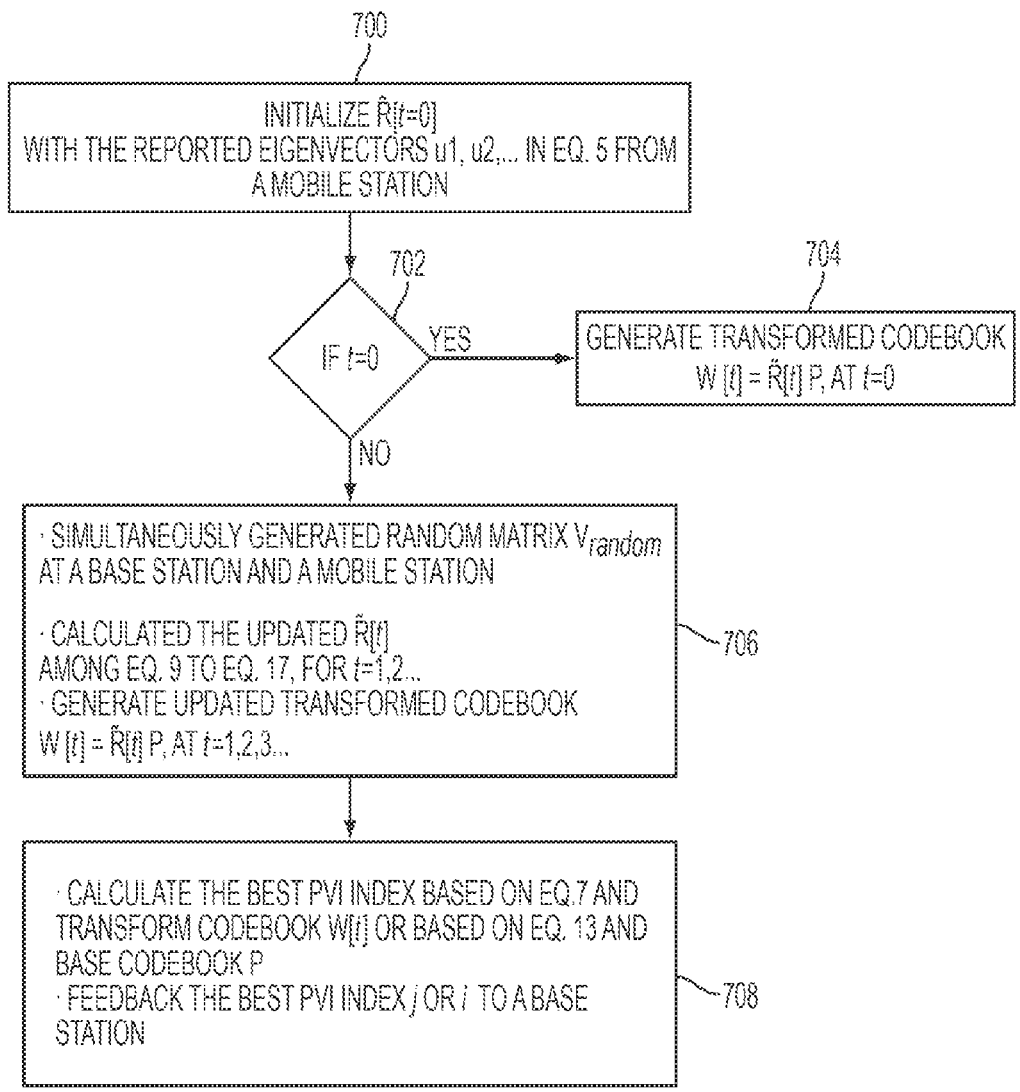
FIG. 7 is a flowchart for an operation of tracking based CL-TCTB with improved initialization of $\tilde{R}[t=0]$ at a base station and a mobile station according to an exemplary embodiment of the present invention.

FIG. 7 is a flowchart for an operation of tracking based CL-TCTB with improved initialization of $\tilde{R}[t=0]$ at a base station and a mobile station according to an exemplary embodiment of the present invention.

Referring to FIG. 7, in step 700, R[t=0] is initialized with the reported eigenvectors $u_1$, $u_2$, etc. in Equation 5, or quantized version of at least one of these eigenvectors, from a mobile station. In step 702, it is determined if t=0. If it is determined that t=0, in step 704, the transformed codebook W[t] is generated using the base codebook P based on the equation W[t]=$\tilde{R}[t]$P, at t=0. If it is not determined that t=0, in step 706, a random matrix $v_{random}$ is simultaneously generated at both a base station and a mobile station. Also in step 706, the updated $\tilde{R}[t]$ is calculated using one of Equations 9, 10, 11, 12, 15, 16, 17, or 18 for t=1, 2, 3, etc. Also in step 706, the updated transformed codebook W[t] is generated based on the equation W[t]=$\tilde{R}[t]$P, at t=1, 2, 3, etc. In step 708, the best PVI index is calculated based on Equation 7 and transform codebook W[t], or is based on Equation 13 and base codebook P. Also in step 708, the best PVI feedback index j or i are fed back to the base station.

Tracking Equation Used Simultaneously at Base station and Mobile Station for Tacking-R[t] Based CL-TCTB For the purpose of notation simplification, in the following sections, $w_j$ and $v_{random}$ may be used interchangeably in the equations 9, 10, 11, 12, 15, 16, 17, or 18 with $\tilde{v}_j$ and $u_{random}$, respectively. Namely, $w_j$ corresponds to $\tilde{v}_j$ and $v_{random}$ corresponds to $u_{random}$. In addition, the transformation codebook W in equation 6 corresponds to $\tilde{V}$. That is, W corresponds to $\tilde{V}$, where $\tilde{V} = \{\tilde{v}_1, \tilde{v}_2, \tilde{v}_3, \ldots \tilde{v}_D\}$ and $\tilde{v}_j$ is the is the $j^{th}$ matrix of $\tilde{V}$.

In another exemplary embodiment of the present invention, an Advanced Mobile Station (AMS) and an Advanced Base Station (ABS) set the transmit correlation matrix to the feedback value of R when the feedback report is transmitted. Between two feedback reports of the transmit correlation matrix, both the AMS and the ABS simultaneously track and refine the transmit correlation matrix R. An example of the tracking equation for estimating R in a feedback period is as follows:

$$R[t] = \alpha R[t-1] + (1-\alpha) \tilde{v}_i[t] \tilde{v}_i^H[t] + \beta u_{random}[t] u_{random}^H[t]$$ Equation 19 where t is a Precoding Matrix Index (PMI) feedback period index.

α is the forgetting factor, which is designed to track mobility of a mobile channel.

β is the random factor.

$\tilde{v}_i[t]$ is the i-th codeword of a transformation codebook in the PMI feedback period t.

$u_{random}[t]$ is a normalized complex random matrix used in the tracking equation in the PMI feedback period t.

The feedback period index t may be defined as:

$$t=\lfloor(\text{FRAME\_NUMBER}-\text{FEEDBACK\_FRAME\_OFFSET})/\text{SHORT\_TERM\_FEEDBACK\_PERIOD}\rfloor \quad \text{Equation 20}$$

where FEEDBACK_FRAME_OFFSET and SHORT_TERM_FEEDBACK_PERIOD are defined in a feedback allocation Advanced MAP Information Element (A-MAP IE). Where SHORT_TERM_FEEDBACK_PERIOD p is the period of feedback transmitted on the FeedBack CHannel (FBCH) every $2^p$ frames. FEEDBACK_FRAME_OFFSET is an offset where an AMS starts reporting at a frame of which the number has the same 3 Least Significant Bits (LSBs) as the specified frame offset.

In another exemplary embodiment of the present invention, R[t] in Equation 19 is normalized before applying the base codebook P in order to generate the transform codebook W in Equation 6.

Alternative Tracking Equation Used Simultaneously at Base Station and Mobile Station for Tacking-R[t] Based CL-TCTB In another exemplary embodiment of the present invention, in a case where timing and phase of ABS antennas are well calibrated, an AMS and the ABS set the transmit correlation matrix to the feedback value of R when the feedback report is transmitted. Between two feedback reports of a transmit correlation matrix, both the AMS and the ABS simultaneously track and refine the transmit correlation matrix R. An example of the tracking equation for estimating R in a feedback period is as follows:

$$R[t]=\alpha R[t-1]+(1-\alpha)\tilde{v}_i[t]\tilde{v}_i^H[t]+C[t] \quad \text{Equation 21}$$

where
t is a PMI feedback period index. The feedback period index t is defined above in Equation 20.
α is the forgetting factor, which is designed to track mobility of a mobile channel.
C[t] is a matrix used to optimize convergence speed of an approaching actual R.
β is the random factor.
$\tilde{v}_i[t]$ is an i-th codeword of a transformation codebook in a PMI feedback period t.

Another example of the tracking equation for estimating R in a feedback period is as follows:

$$R[t]=\alpha R[t-1]+(1-\alpha)\tilde{v}_i[t]\tilde{v}_i^H[t] \quad \text{Equation 22}$$

where
t is a PMI feedback period index. The feedback period index t is defined above in Equation 20.
α is the forgetting factor, which is designed to track mobility of a mobile channel.
$\tilde{v}_i[t]$ is an i-th codeword of a transformation codebook in a PMI feedback period t.

In another exemplary embodiment of the present invention, an AMS and an ABS set the transmit correlation matrix to a feedback value of R when a feedback report is transmitted. Between two feedback reports of a transmit correlation matrix, both the AMS and the ABS shall simultaneously track and refine the transmit correlation matrix R. An example of the tracking equation for estimating R in a feedback period is as follows:

$$R[t]=\alpha R[t-1]+(1-\alpha-\beta[t])\tilde{v}_i[t]\tilde{v}_i^H[t]+\beta[t]u_{random}[t]u_{random}^H[t] \quad \text{Equation 23}$$

where
t is a PMI feedback period index. The feedback period index t is defined above in Equation 20.
α is the forgetting factor, which is designed to track mobility of a mobile channel.

β[t] is a random factor as a function of time t.
$\tilde{v}_i[t]$ is an i-th codeword of a transformation codebook in a PMI feedback period t.
$u_{random}[t]$ is an normalized complex random matrix used in the tracking equation in PMI feedback period t.

In another exemplary embodiment of the present invention, in a case where timing and phase of ABS antennas are well calibrated, an AMS and an ABS set the transmit correlation matrix to the feedback value of R when the feedback report is transmitted. Between two feedback reports of a transmit correlation matrix, both the AMS and the ABS simultaneously track and refine the transmit correlation matrix R. An example of the tracking equation for estimating R in a feedback period is as follows:

$$R[t]=\alpha R[t-1]+(1-\alpha-\beta[t])\tilde{v}_i[t]\tilde{v}_i^H[t]+\beta[t]C[t] \quad \text{Equation 24}$$

where
t is a PMI feedback period index. The feedback period index t is defined above in Equation 20.
α is the forgetting factor, which is designed to track mobility of a mobile channel.
C[t] is a matrix used to optimize convergence speed of an approaching actual R.
β[t] is the random factor as function of time t. It is noted that β[t] is a decaying function as time increases.
$\tilde{v}_i[t]$ is an i-th codeword of a transformation codebook in a PMI feedback period t.

Another example of the tracking equation for estimating R in a feedback period is as follows:

$$R[t]=f_1(\alpha,\beta)R[t-1]+f_2(\alpha,\beta)\tilde{v}_i[t]\tilde{v}_i^H[t]+f_3(\alpha,\beta)c[t]c^H[t] \quad \text{Equation 25}$$

where
t is a PMI feedback period index.
$\tilde{v}_i[t]$ is an i-th codeword of a transformation codebook in PMI feedback period t.
α is the forgetting factor, which is designed to track mobility of a mobile channel.
β is the random factor. It is noted that β[t] is a decaying function as time increases.
$f_1(\alpha,\beta)$, $f_2(\alpha,\beta)$, and $f_3(\alpha,\beta)$ are functions of parameters β and α, which are used to optimize system performance. In another exemplary embodiment of the present invention, $f_1(\alpha,\beta)=\alpha$, $f_2(\alpha,\beta)=1-\alpha-\beta$, and $f_3(\alpha,\beta)=\beta$. In still another exemplary embodiment of the present invention, $f_1(\alpha,\beta)=\alpha$, $f_2(\alpha,\beta)=1-\alpha-\beta[t]$, and $f_3(\alpha,\beta)=\beta[t]$.
c[t] is the matrix used to optimize convergence speed of an approaching actual R.
β is the random factor as function of time t.

An operation procedure of a CL-TCTB system with tracking based methods for R[t] in the equations 20, 21, 22, 23 or 24, which is simultaneously tracked at both an ABS and an AMS is described below with reference to FIG. 8.

Figure 8:
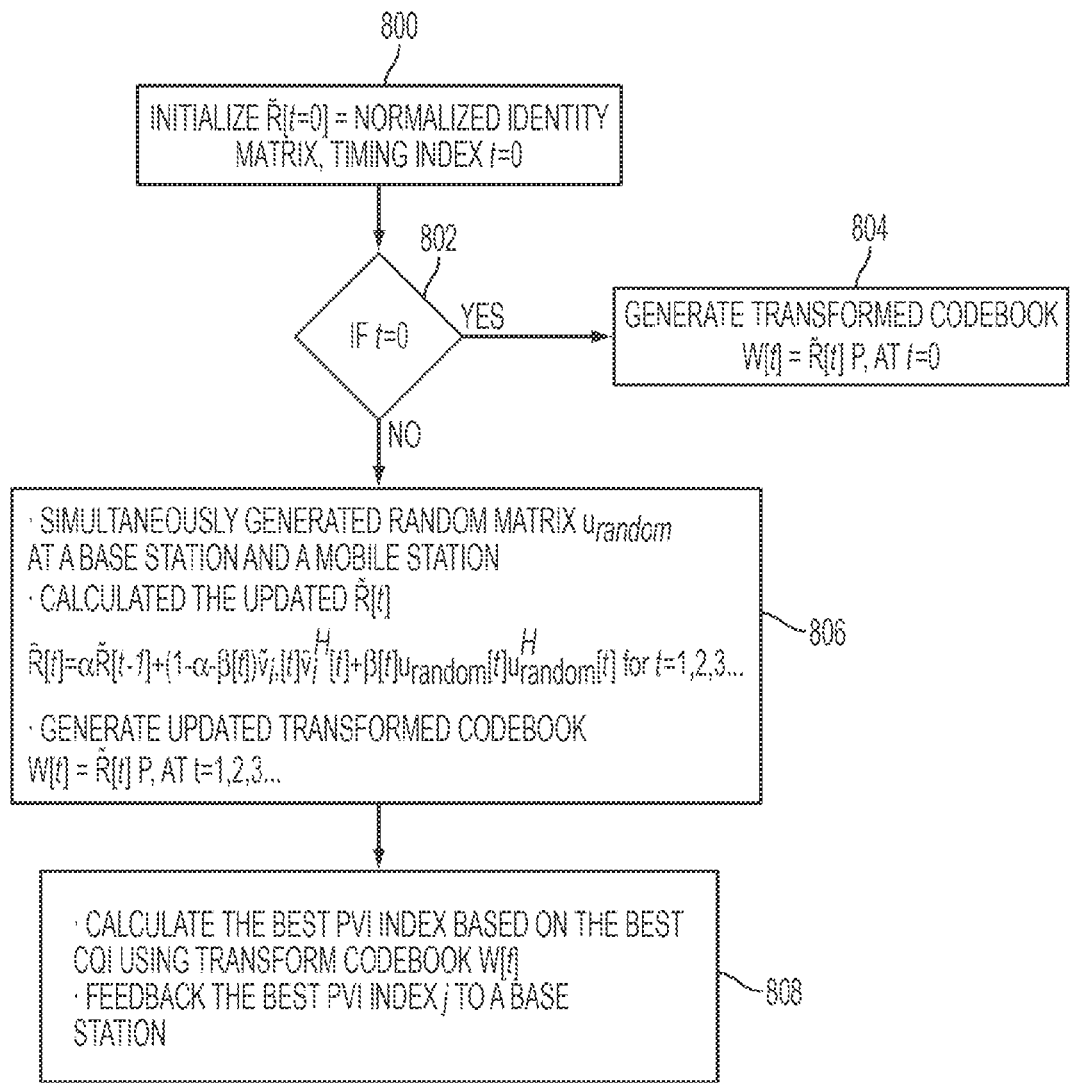
FIG. 8 is a flowchart for an operation of tracking based CL-TCTB at a base station and a mobile station according to an exemplary embodiment of the present invention.

FIG. 8 is a flowchart for an operation of tracking based CL-TCTB at a base station and a mobile station according to an exemplary embodiment of the present invention.

Referring to FIG. 8, in step 800, $\tilde{R}[t=0]$ is initialized with the normalized identity matrix at timing index t=0. In step 802, it is determined if t=0. If it is determined that t=0, in step 804, the transformed codebook W[t] is generated using the base codebook P based on the equation W[t]=$\tilde{R}$[t]P, at t=0. If it is not determined that t=0, in step 806, a random matrix $u_{random}$ is simultaneously generated at both a base station and a mobile station. Also in step 806, the updated $\tilde{R}$[t] is calculated using Equation 23 for t=1, 2, 3, etc. Also in step 806, the updated transformed codebook W[t] is generated based on the equation W[t]=$\tilde{R}$[t]P, at t=1, 2, 3, etc. In step 808, the best PVI index is calculated based on the best CQI using the transform codebook W[t]. Also in step 808, the best PVI feedback index j or i are fed back to the base station.

Control Signaling of $\alpha, \beta$ and $\gamma$ for Tracking-$\tilde{R}$ Based CL-TCTB As described in the previous section, $\alpha$ is the forgetting factor, which is designed to track the mobility of mobile channel, $\beta$ is the random factor, which is designed to avoid a bias estimation of $\tilde{R}$. $\gamma$ is a parameter related to a SINR or CQI value.

In another exemplary embodiment of the current invention, the updated period (cycle) of $\alpha$, $\beta$ and $\gamma$ in the equations 9, 10, 11, 12, 13, 15, 16, 17, 18, 19, 21, and/or 22 can be the same or different. It is noted that $\alpha$, $\beta$ and $\gamma$ are typically real numbers.

In another exemplary embodiment of the present invention, a base station signals the parameter value of $\alpha$ (the forgetting factor) and $\beta$ (the random factor) to a mobile station in the equations 9, 10, 11, 12, 13, 15, 16, 17, 18, 19, 21 and/or 22. In another exemplary embodiment of the present invention the range of the parameter value for $\alpha$ (the forgetting factor) and $\beta$ (the random factor) is between 0 and 1.

In another exemplary embodiment of the present invention, an ABS signals the value of the forgetting factor $\alpha$ using the following 3-bit table, namely <b2b1b0>, as shown below in Table 1. Table 1 shows 3-bit of values for signaling $\alpha$.

TABLE 1

| <b2b1b0> | $\alpha$ |
|---|---|
| 000 | 0 |
| 001 | 0.2 |
| 010 | 0.4 |
| 011 | 0.5 |
| 100 | 0.7 |
| 101 | 0.8 |
| 110 | 0.9 |
| 111 | 0.95 |

Alternatively, in another exemplary embodiment of the present invention, an ABS signals the value of the forgetting factor $\alpha$ using the following 3-bit table, namely <b2b1b0>, as shown below in Table 2. Table 2 shows 3-bit of values for signaling $\alpha$.

TABLE 2

| <b2b1b0> | $\alpha$ |
|---|---|
| 000 | 0.1 |
| 001 | 0.2 |
| 010 | 0.4 |
| 011 | 0.5 |
| 100 | 0.7 |
| 101 | 0.8 |
| 110 | 0.9 |
| 111 | 0.95 |

In another exemplary embodiment of the present invention, an ABS signals the value of the random factor $\beta$ using the following 3-bit table, namely <b2b1b0>, as shown below in Table 3. Table 3 shows 3-bit of values for signaling $\beta$.

TABLE 3

| <b2b1b0> | $\beta$ |
|---|---|
| 000 | 0 |
| 001 | 0.2 |
| 010 | 0.3 |
| 011 | 0.4 |

TABLE 3-continued

| <b2b1b0> | $\beta$ |
|---|---|
| 100 | 0.5 |
| 101 | 0.6 |
| 110 | 0.7 |
| 111 | 0.9 |

Alternatively, in another exemplary embodiment of the present invention, an ABS signals the value of the random factor $\beta$ using the following 3-bit table, namely <b2b1b0>, as shown below in Table 4. Table 4 shows 3-bit of values for signaling $\beta$.

TABLE 4

| <b2b1b0> | $\beta$ |
|---|---|
| 000 | 0.1 |
| 001 | 0.2 |
| 010 | 0.3 |
| 011 | 0.4 |
| 100 | 0.5 |
| 101 | 0.6 |
| 110 | 0.7 |
| 111 | 0.9 |

In another exemplary embodiment of the present invention, an ABS signals the value of the random factor $\beta$ using the following 2-bit table, namely <b1b0>, as shown below in Table 5. Table 5 shows 2-bit of values for signaling $\beta$.

TABLE 5

| <b1b0> | $\beta$ |
|---|---|
| 00 | 0 |
| 01 | 0.2 |
| 10 | 0.3 |
| 11 | 0.4 |

Alternatively, in another exemplary embodiment of the present invention, an ABS signals the value of the random factor $\beta$ using the following 2-bit table, namely <b1b0>, as shown below in Table 6. Table 6 shows 2-bit of values for signaling $\beta$.

TABLE 6

| <b1b0> | $\beta$ |
|---|---|
| 00 | 0.1 |
| 01 | 0.2 |
| 10 | 0.3 |
| 11 | 0.4 |

The configuration of $\alpha$, $\beta$, and $\gamma$ may be signaled from the base station to the mobile station. Since the configuration of the algorithm does not need to change too often, the overhead may be quite small.

Generation Procedure of $u_{random}[t]$ for Tracking-$\tilde{R}$ Based CL-TCTB

In another exemplary embodiment of the present invention, in order to increase the convergence speed of $\tilde{R}$, a complex random matrix of $u_{random}$ may be additionally reported. The matrix may be selected from a codebook of random matrices. The codebook of random matrices may be fixed and is known to both a base station and a mobile station. Herein, the mobile station reports the best selected index of random matrices within the codebook to a base station to optimize the convergence speed.

Figure 9:
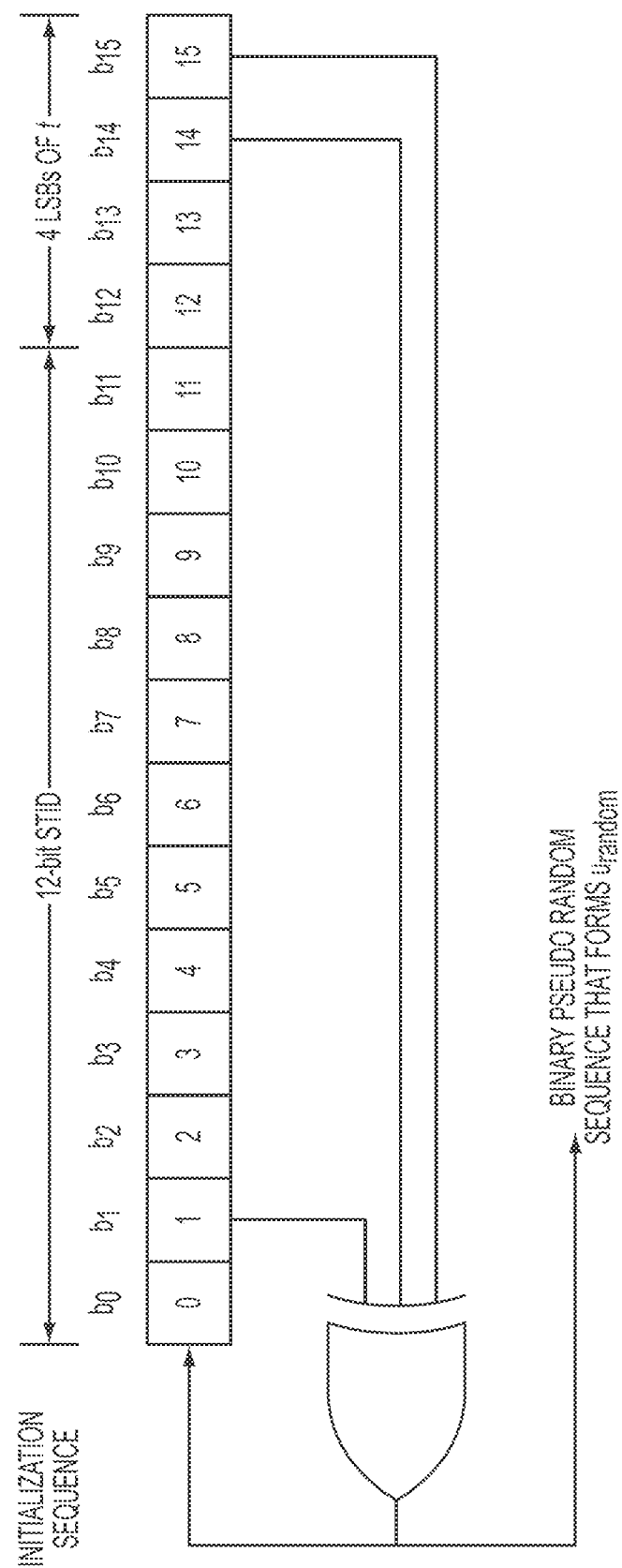
FIG. 9 illustrates a BPRS generator for random matrix generation according to an exemplary embodiment of the present invention.

In another exemplary embodiment of the present invention, $u_{random}$ is generated based on a Binary Pseudo Random Sequence (BPRS) produced by a Linear Feedback Shift Register (LFSR) with a polynomial generator $g(x)=x^{16}+x^{15}+x^2+1$, as shown in FIG. 9.

FIG. 9 illustrates a BPRS generator for random matrix generation according to an exemplary embodiment of the present invention.

Referring to FIG. 9, the BPRS generator is initialized in each feedback period by the seed $b_{15}b_{14}b_{13}b_{12}b_{11} \ldots b_2b_1b_0$. The 12 LSBs of the seed shall be the AMS's STation IDentifier (STID). The 4 Most Significant Bits (MSBs) of the seed are the 4 LSBs of the feedback period index t. The random matrix, $u_{random}$, may be generated as described below.

In a first step, at the beginning of a PMI feedback period t, both an ABS and an AMS initialize the LFSR with the same seed, namely $b_{15}b_{14}b_{13}b_{12}b_{11} \ldots b_2b_1b_0$. The 12 MSBs of the seed shall be the AMS's STID. The 4 LSBs of the seed shall be the 4 LSBs of the feedback period index t.

In a second step, each entry of the random matrix $u_{random}$ is quantized into 8 bits and there are $N_t \times L$ entries in the random matrix $u_{random}$, where $N_t$ is the number of transmit antennas at the ABS and L is the number of beams. Both the ABS and the AMS clock the LFSR $8 \times N_t \times L$ times wherein the first 8 binary output of the LFSR forms the first entry of the matrix, the second 8 binary output of the LFSR forms the second entry of the matrix, and so on. The generated matrix is denoted as $u_{random,unnormalized}$. To form an entry in the random matrix, the first 4 bits form the real part of the entry and the last 4 bits form the imaginary part of the entry. The signage of the real part or the imaginary part is indicated by the first bit of each group of 4 bits.

In a third step, if $\|u_{random,unnormalized}\|^2=0$, the process returns to the second step. Otherwise, the random matrix is normalized by dividing the generated random matrix by its norm, $$u_{random}=u_{random,unnormalized}/\|u_{random,unnormalized}\|.$$ Equation 26

In another exemplary embodiment of the present invention, the tracking equation of the subband correlation matrix R[n] and the control signaling of $\alpha$ and $\beta$ for tracking R[n] that is used simultaneously at an ABS and an AMS for transformation codebook-based antenna beamforming is described as below.

In a case where the ABS has eight transmit antennas, an AMS and the ABS follow the procedure described below, in order to provide further information about the transmit correlation matrix, in addition to the information provided by the wideband correlation matrix R. An aspect of this procedure is to provide a method for the AMS and ABS to calculate the per-sub-band (narrowband) correlation matrix, denoted below as $R_s$ for a sub-band s. The following procedure, which includes the resetting of the estimate of $R_s$ and includes the updating of the estimate of $R_s$, applies to each ABS-AMS pair.

The resetting of the estimate of $R_s$ is described below. When the AMS transmits the wideband correlation matrix R to the ABS, for every sub-band s in the system, the ABS sets $R_s=R$, i.e., the AMS sets the sub-band correlation matrix to be the same as the wideband correlation matrix. The ABS shall likewise, i.e., upon receiving a wideband correlation matrix R reported by the AMS, set $R_s=R$ for every sub-band s in the system.

The updating of the estimate of $R_s$ is described below. Between two long-term feedback reports of the wideband correlation matrix R, both the AMS and the ABS simultaneously track and update/refine the correlation matrix $R_s$ for each subband s. For each sub-band s, $R_s$ is updated each short reporting period, which is defined in the Feedback Allocation A-MAP IE. The update is performed using the equations shown below. In these equations, the index n is in units of the short reporting period, and $R_s[n]$ represents the update of $R_s$ after receiving the PMI information for the $n^{th}$ short reporting period. n=0 corresponds to the reset event as defined above with respect to the resetting of the estimate of $R_s$.

An example of the update equation, according to an exemplary embodiment of the present invention, is as follows:

$$R_s[n] = \begin{cases} \alpha R_s[n-1] + \\ (1-\alpha)\tilde{v}_{i,s}[n]\tilde{v}_{i,s}^H[n] + & \text{if } PMI \text{ for} \\ \beta u_{random}[n]u_{random}^H[n], & \text{subband } s \text{ reported} \\ R_s[n-1], & \text{if } PMI \text{ for subband} \\ & s \text{ not reported} \end{cases}$$ Equation 27 where n is a short PMI feedback period index, as explained above.

$R_s[n]$ is a correlation matrix for sub-band s at instant n. From the reset event described above with respect to the resetting of the estimate of $R_s$, $R_s[0]=R$.

$\alpha$ is the forgetting factor, which is designed to track mobility of a mobile channel.

$\tilde{v}_{i,s}[n]$ is an i-th codeword of a transformed codebook for sub-band s at time instant n as indicated by the PMI at time instant n. This PMI refers to a transformed codebook, which the ABS and the AMS obtain by applying the matrix $R_s[n-1]$ to the transformed codebook for sub-band s at time instant n-1. Note that to get the codebook at time instant n, successive transformation operations, identical at the ABS and AMS, are implied, i.e., the codebook at n=0 is the base codebook, the codebook at n=1 is obtained by applying $R_s[0]$ to the codebook at n=0, the codebook at n=2 is obtained by applying $R_s[1]$ to the codebook at n=1, and so on. Hence, $\tilde{v}_{i,s}[0]$ is a codeword in the base codebook, $v_{i,s}[1]$ is a codeword in the codebook obtained by applying $R_s[0]=R$ to the codebook for n=0 (base codebook), $\tilde{v}_{i,s}[2]$ is a codeword in the codebook obtained by applying $R_s[1]$ to the transformed codebook for n=1, and so on.

$\beta$ is the random factor.

$u_{random}[n]$ is a complex random matrix, whose generation random procedure is described below.

R is wideband (wholeband) correlation matrix for initiation.

The signaling of the forgetting factor $\alpha$ and the random factor $\beta$ are described below.

An ABS signals the value of the forgetting factor $\alpha$ using the following 2-bit table, namely <b1b0>, as shown below in Table 7. Table 7 shows 2-bit values for signaling $\alpha$.

TABLE 7

| <b1b0> | $\alpha$ |
|---|---|
| 00 | 0.8 |
| 01 | 0.9 |
| 10 | 0.95 |
| 11 | 0.98 |

An ABS signals the value of the random factor $\beta$ using the following 2-bit table, namely <b1b0>, as shown in Table 8. Table 8 shows 2-bit values for $\beta$.

TABLE 8

| <b1b0> | β |
|---|---|
| 00 | 0.05 |
| 01 | 0.08 |
| 10 | 0.1 |
| 11 | 0.15 |

Herein, $u_{random}$ is generated based on a binary pseudorandom sequence produced by a LFSR with the polynomial generator $g(x)=x^{16}+x^{15}+x^2+1$, as described above with reference to FIG. 9.

An example of an update equation, according to another exemplary embodiment of the present invention, is as follows:

$$R_s[n] = \begin{cases} \alpha R_s[n-1] + \\ (1-\alpha)\tilde{v}_{i,s}[n]\tilde{v}_{i,s}^H[n], & \text{if PMI for subband } s \text{ reported} \\ R_s[n-1], & \text{if PMI for subband } s \text{ not reported} \end{cases} \quad \text{Equation 28}$$

where n is a short PMI feedback period index, as explained above.

$R_s[n]$ is the correlation matrix for sub-band s at instant n. From the reset event in the first step, $R_s[0]=R$.

α is the forgetting factor, which is designed to track mobility of a mobile channel.

$\tilde{v}_{i,s}[n]$ is an i-th codeword of a transformed codebook for sub-band s at time instant n as indicated by the PMI at time instant n. This PMI refers to a transformed codebook, which the ABS and the AMS obtain by applying the matrix $R_s[n-1]$ to the transformed codebook for sub-band s at time instant n−1. Note that to get the codebook at time instant n, successive transformation operations, identical at the ABS and the AMS, are implied, i.e., the codebook at n=0 is the base codebook, the codebook at n=1 is obtained by applying $R_s[0]$ to the codebook at n=0, the codebook at n=2 is obtained by applying $R_s[1]$ to the codebook at n=1, and so on. Hence, $\tilde{v}_{i,s}[0]$ is a codeword in the base codebook, $\tilde{v}_{i,s}[1]$ is a codeword in the codebook obtained by applying $R_s[0]=R$ to the codebook for n=0 (base codebook), $\tilde{v}_{i,s}[2]$ is a codeword in the codebook obtained by applying $R_s[1]$ to the transformed codebook for n=1, and so on.

R is wideband (whole) correlation matrix for initiation.

Regarding the signaling of the forgetting factor α, an ABS signals the value of the forgetting factor α using the 2-bit table, namely <b1b0>, as shown above in Table 7.

In another exemplary embodiment of the present invention, the tracking equation for tracking wideband correlation matrix R[n] that is simultaneously used by an ABS and an AMS for transformation mode codebook-based antenna beamforming is described below.

In a case where the ABS has eight transmit antennas, the AMS and the ABS follow the procedure described below, in order to provide further information about the transmit correlation matrix, in addition to the information provided by the wideband correlation matrix R. An aspect of this procedure is to provide a method for the AMS and the ABS to track a wideband correlation matrix, denoted below as $R_t$. The following procedure, which includes the resetting of the estimate of $R_t$ and includes the updating of the estimate of $R_t$, applies to each ABS-AMS pair.

The resetting of the estimate of $R_t$ is described below. When the AMS transmits the wideband correlation matrix R to the ABS, the AMS sets $R_t=R$. The ABS shall do likewise, i.e., upon receiving a wideband correlation matrix R reported by the AMS, the ABS sets $R_t=R$.

The updating of the estimate of $R_t$ is described below. Between two long-term feedback reports of the wideband correlation matrix R, both the AMS and the ABS shall simultaneously track and update/refine the correlation matrix $R_t$ with a short reporting period of sub-band PMI feedback information, which is defined in the Feedback Allocation A-MAP IE. The update is performed using the equations shown below. In these equations, the index n is in units of the short reporting period, and $R_t[n]$ represents the update of $R_t$ after receiving the PMI information for the $n^{th}$ short reporting period. n=0 corresponds to the reset event as defined above with respect to the resetting of the estimate of $R_t$.

An example of the update equation, according to an exemplary embodiment of the present invention, is as follows:

$$R_t[n] = \alpha R_t[n-1] + (1-\alpha)\sum_{s=1}^{M} \frac{1}{M} \tilde{v}_{i,s}[n]\tilde{v}_{i,s}^H[n] \quad \text{Equation 29}$$

where n is a PMI feedback period index.

α is the forgetting factor, which is designed to track mobility of a mobile channel.

$\tilde{v}_{i,s}[n]$ is an i-th codeword of the transformed codebook for sub-band s at time instant n as indicated by the PMI at time instant n. This PMI refers to a transformed codebook, which the ABS and AMS obtain by applying the matrix $R_t[n-1]$ to the transformed codebook at time instant n−1. Note that to get the codebook at time instant n, successive transformation operations, identical at the ABS and AMS, are implied, i.e., the codebook at n=0 is the base codebook, the codebook at n=1 is obtained by applying $R_t[0]$ to the codebook at n=0, the codebook at n=2 is obtained by applying $R_t[1]$ to the codebook at n=1, and so on. Hence, $\tilde{v}_{i,s}[0]$ is a codeword in the base codebook, $\tilde{v}_{i,s}[1]$ is a codeword in the codebook obtained by applying $R_t[0]=R$ to the codebook for n=0 (base codebook), $\tilde{v}_{i,s}[2]$ is a codeword in the codebook obtained by applying $R_t[1]$ to the transformed codebook for n=1, and so on.

R is wideband (whole) correlation matrix for initiation.

In another exemplary embodiment of the present invention, the forgetting factor α used in the above tracking equation may be set to the value of 0.9. In still another exemplary embodiment of the present invention, an ABS signals the value of the forgetting factor α using the 2-bit table, namely <b1b0>, as shown above in Table 7.

Another example of the update equation, according to another exemplary embodiment of the present invention, is as follows:

$$R_t[n] = \alpha R_t[n-1] + (1-\alpha)\sum_{s=1}^{M} \frac{\lambda_s}{\sum_{s=1}^{M} \lambda_s} \tilde{v}_{i,s}[n]\tilde{v}_{i,s}^H[n] \quad \text{Equation 30}$$

where n is a PMI feedback period index.

α is the forgetting factor, which is designed to track mobility of a mobile channel.

$\tilde{v}_{i,s}[n]$ is an i-th codeword of a transformed codebook for sub-band s at time instant n as indicated by the PMI at time instant n. This PMI refers to a transformed codebook, which the ABS and AMS obtain by applying the matrix $R_t[n-1]$ to the transformed codebook at time instant n−1. Note that to get the codebook at time instant n, successive transformation operations, identical at the ABS and AMS, are implied, i.e., the codebook at n=0 is the base codebook, the codebook at n=1 is obtained by applying $R_t[0]$ to the codebook at n=0, the codebook at n=2 is obtained by applying $R_t[1]$ to the codebook at n=1, and so on. Hence, $\tilde{v}_{i,s}[0]$ is a codeword in the base codebook, $\tilde{v}_{i,s}[1]$ is a codeword in the codebook obtained by applying $R_t[0]=R$ to the codebook for n=0 (base codebook), $\tilde{v}_{i,s}[2]$ is a codeword in the codebook obtained by applying $R_t[1]$ to the transformed codebook for n=1, and so on.

R is wideband (whole) correlation matrix for initiation.

$\lambda_s$ is a CQI Channel Quality Indication (CQI) for the s-th subband or the selected Modulation and Coding Selection (MCS) level for the s-th subband. For example, the value of $\lambda_s$ may range from 0 to 31 if the number of the MSC level is 5 bits (namely, b4b3b2b1b0). Then, the value of $\lambda_s$ may range from 00000 to b11111. The CQI or MCS is derived and feedback by the AMS to the ABS.

M is a number of feedback subbands by the AMS.

In another exemplary embodiment of the present invention, the tracking equation for tracking a wideband correlation matrix R[n] that is simultaneously used at an ABS and an AMS for transformation mode codebook-based antenna beamforming is described below.

In a case where the ABS has eight transmit antennas, the AMS and the ABS may further follow the procedure described below, in order to provide further information about the transmit correlation matrix, in addition to the information provided by the wideband correlation matrix R. An aspect of this procedure is to provide a method for the AMS and the ABS to continuously update the correlation matrix, denoted below as $R_t$. The following procedure, which includes the resetting of the estimate of $R_t$ and includes the updating of the estimate of $R_t$, applies to each ABS-AMS pair.

The resetting of the estimate of $R_t$ is described below. When the AMS transmits the wideband correlation matrix R to the ABS, the AMS sets $R_t=R$. The ABS shall do likewise, i.e., upon receiving a wideband correlation matrix R reported by the AMS, the ABS sets $R_t=R$.

The updating of the estimate of $R_t$ is described below. Between two long-term feedback reports of the wideband correlation matrix R, both the AMS and the ABS shall simultaneously track and update/refine the correlation matrix $R_t$. $R_t$ is be updated each short reporting period, which is as defined in the Feedback Allocation A-MAP IE. The update is performed using the equations below. In these equations, the index n is in units of the short reporting period, and $R_t[n]$ represents the update of $R_t$ at time instant n based on the PMI information received at time instant (n−1). n=0 corresponds to the reset event as defined above with respect to the resetting of the estimate of $R_t$.

An example of the update equation, according to an exemplary embodiment of the present invention, is as follows:

$$R_t[n] = \begin{cases} 0.9 R_t[n-1] + \\ 0.1 \sum_{s=1}^{M} \tilde{v}_s[n-1]\tilde{v}_s^H[n-1], \\ \quad \text{if a PMI for subband } s \text{ reported at time instant } (n-1) \\ R_t[n-1], \\ \quad \text{if a PMI for subband } s \text{ is not reported at time instant } (n-1) \end{cases} \quad \text{Equation 31}$$

where n is a PMI feedback period index.

$\tilde{v}_s[n]$ is the PMI for subband s based on a transformed codebook at time instant n. This PMI refers to a transformed codebook. Alternatively, $\tilde{v}_s[n]$ is the codeword indicated by the PMI for subband s based on transformed codebook at time instant n.

M is a number of subbands for which PMI is fed back.

Another example of the update equation, according to another exemplary embodiment of the present invention, is as follows:

$$R_t[n] = \begin{cases} 0.9 R_t[n-1] + \\ 0.1 \sum_{s=1}^{M} \frac{\lambda_s}{\sum_{s=1}^{M} \lambda_s} \tilde{v}_s[n-1]\tilde{v}_s^H[n-1], \\ \quad \text{if a PMI for subband } s \text{ reported at time instant } (n-1) \\ R_t[n-1], \\ \quad \text{if a PMI for subband } s \text{ is not reported at time instant } (n-1) \end{cases} \quad \text{Equation 32}$$

where n is a PMI feedback period index.

$\tilde{v}_s[n]$ is the PMI for subband s based on transformed codebook at time instant n. This PMI refers to a transformed codebook.

$\lambda_s$ is a CQI for an s-th subband or a selected MCS level for the s-th subband. For example, the value of $\lambda_s$ may range from 0 to 31 if the number of MCS level is 5 bits (namely, b4b3b2b1b0). Then, the value of $\lambda_s$ may range from 00000 to b11111. The CQI or MCS is derived and feedback by the AMS to the ABS.

M is a number of subbands for which PMI is fed back.

Generation Procedure of $\tilde{v}_i[t]$ for Tracking-$\tilde{R}$ Based CL-TCTB $R[t]=\alpha R[t-1]+(1-\alpha)\tilde{v}_i[t]\tilde{v}_i^H[t]+\beta u_{random}[t]u_{random}^H[t]$ is generated at feedback period t (frame #t) from PMI i in a transformed codebook. $\tilde{v}_i[t]$ is used at transmission time t+1 (frame #t+1) for downlink precoding. $\tilde{v}_i[t]$ is generated from R[t−1].

| Frame t | Frame t + 1 | Frame |
|---|---|---|
| AMS feedback PMI j ($\tilde{v}_j[t]$) ABS calculates $\tilde{v}_j[t]$ from R[t − 1] and j | ABS transmits DL burst with $\tilde{v}_i[t]$ ABS/AMS construct R[t] from $\tilde{v}_i[t]$ AMS feedback PMI i ($\tilde{v}_i[t+1]$) ABS calculates $\tilde{v}_i[t+1]$ from R[t] and i | t + 2 |

$$\tilde{v}_i = \frac{Rv_i}{\|Rv_i\|},$$

where $v_i$ is in the base codebook, $\tilde{v}_i$ is in the transformed codebook.

$$\text{So } \tilde{v}_i[t+1] = \frac{R[t]v_i[t+1]}{\|R[t]v_i[t+1]\|}.$$

The normalization factor is excluded in the following expressions.
Then $$\tilde{v}_i[t+1] = (\alpha R[t-1] + (1-\alpha)\tilde{v}_j[t]\tilde{v}_j^H[t] + \beta u_{random}[t]u_{random}^H[t])v_i[t+1]$$

$$\tilde{v}_i[t+1] = \alpha R[t-1]v_i[t+1] + (1-\alpha)\tilde{v}_j[t]\tilde{v}_j^H[t]v_i[t+1] + \beta u_{random}[t]u_{random}^H[t]v_i[t+1]$$

$$\tilde{v}_i[t+1] = \alpha R[t-1]v_i[t+1] + (1-\alpha)\tilde{v}_j[t](\tilde{v}_j^H[t]v_i[t+1]) + \beta u_{random}[t](u_{random}^H[t]v_i[t+1])$$

So $$\tilde{v}_i[t+1] = \alpha R[t-1]v_i[t+1] + a(1-\alpha)\tilde{v}_j[t] + b\beta u_{random}[t]$$

Where scalars are defined as $a = \tilde{v}_j^H[t]v_i[t+1]$ and $b = u_{random}^H[t]v_i[t+1]$.

$$a = \kappa v_j^H[t]R^H[t-1]v_i[t+1],$$

where $\kappa$ is a normalization factor for $\tilde{v}_j^H[t]$.
So $$\tilde{v}_i[t+1] = \alpha R[t-1]v_i[t+1] + \kappa(v_j^H[t]R^H[t-1]v_i[t+1])(1-\alpha)\tilde{v}_j[t] + b\beta u_{random}[t]$$

$$\tilde{v}_i[t+1] = \alpha R[t-1]v_i[t+1] + \kappa(v_j^H[t]R[t-1]v_i[t+1])(1-\alpha)\tilde{v}_j[t] + b\beta u_{random}[t] (R \text{ is Hermitian})$$

$$\tilde{v}_i[t+1] = \alpha R[t-1]v_i[t+1] + \kappa(v_j^H[t]R^{H/2}[t-1]R^{1/2}[t-1]v_i[t+1])(1-\alpha)\tilde{v}_j[t] + b\beta u_{random}[t]$$

$$\tilde{v}_i[t+1] = \alpha R[t-1]v_i[t+1] + \kappa(R^{1/2}[t-1]v_j[t])^H(R^{1/2}[t-1]v_i[t+1])(1-\alpha)\tilde{v}_j[t] + b\beta u_{random}[t].$$

Finally $$\tilde{v}_i[t+1] \square \alpha R[t-1]v_i[t+1] + \kappa(\hat{v}_j^H[t]\hat{v}_i[t+1])(1-\alpha)\tilde{v}_j[t] + b\beta u_{random}[t]$$

or, $$\tilde{v}_i[t+1] = \alpha R[t-1]v_i[t+1] + \kappa(\tilde{v}_j^H[t]\tilde{v}_i[t])(1-\alpha)\tilde{v}_j[t] + b\beta[t]u_{random}[t]$$

So the new precoder is the sum of:
a precoder obtained from the old transformed codebook with index i weighted by α (the precoder that would be used if the transformed codebook had not been updated from the last feedback period).

the previous precoder weighted by (1−α) and by $\hat{v}_j^H[t]\hat{v}_i[t+1]$ (scalar product of two codewords obtained from some square-root transformed codebook with the PMI feedback of periods t−1 and t).

a random matrix weighted by β and its scalar product with the PMI from the base codebook (which has no physical meaning since the feedback index i refers to the transformed codebook).

Figure 10:
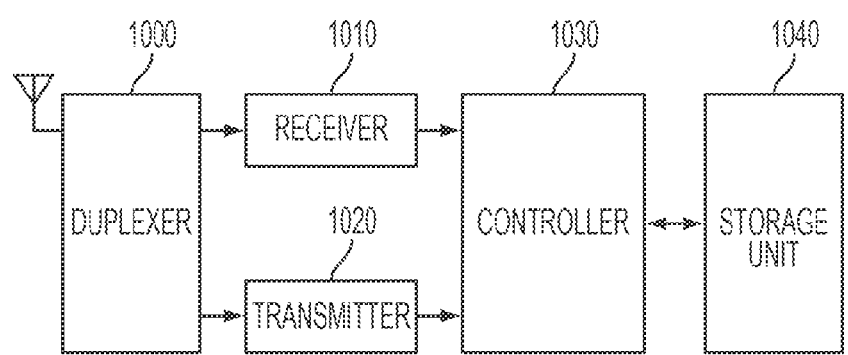
FIG. 10 is a block diagram illustrating a receiver in a wireless communication system according to an exemplary embodiment of the present invention.

FIG. 10 is a block diagram illustrating a receiver in a wireless communication system according to an exemplary embodiment of the present invention.

Referring to FIG. 10, the receiver includes a duplexer 1000, a receiver 1010, a transmitter 1020, a controller 1030, and a storage unit 1040. The receiver may include any number of additional structural elements. However, a description of additional structural elements of the receiver is omitted for conciseness. The receiver may be a mobile station, an AMS, etc.

The duplexer 1000 transmits a transmission signal provided from the transmitter 1020 via an antenna, and provides a reception signal from the antenna to the receiver 1010 according to a duplexing scheme.

The receiver 1010 processes the reception signal based on beamforming coefficients and converts the reception signal into a baseband signal, and provides the baseband signal to the controller 1030. For example, when the wireless communication system uses an OFDM scheme, the receiver 1010 includes a Radio Frequency (RF) processor, an Analog/Digital Converter (ADC), an OFDM demodulator, and a decoder. Accordingly, the RF processor converts an RF signal provided from the duplexer 1000 into a baseband analog signal. The ADC converts the analog signal provided from the RF processor into digital sample data. The OFDM demodulator transforms sample data in a time domain provided from the ADC into data in a frequency domain by performing a Fast Fourier Transform (FFT). The decoder demodulates and decodes a signal provided from the OFDM demodulator according to a Modulation and Coding Scheme (MCS) level.

The controller 1030 controls overall operations of the receiver. The operations of receiver include any of the operations explicitly or implicitly described above as being performed by a receiver, mobile station, or AMS. In addition, the controller 1030 determines and provides beamforming coefficients to the receiver 1010 and the transmitter 1020.

The transmitter 1020 converts a transmission signal into an RF signal, processes the RF signal based on beamforming coefficients, and provides the processed RF signal to the duplexer 1000 under control of the controller 1030. For example, when the wireless communication system uses an OFDM scheme, the transmitter 1020 includes an encoder, an OFDM modulator, a Digital/Analog Converter (DAC) and an RF processor. The encoder encodes and modulates a transmission signal according to an MCS level under control of the controller 1030. The OFDM modulator converts data in the frequency domain provided from the encoder into sample data (i.e., an OFDM symbol) in a time domain by performing an Inverse FFT (IFFT). The DAC converts sample data provided from the OFDM modulator into an analog signal. The RF processor converts a baseband analog signal provided from the DAC into an RF signal.

The storage unit 1040 stores programs required for overall operations of the receiver and various data, including any of the information and/or the algorithms discussed herein as being received, transmitted, retained or used by a receiver, mobile station, or AMS.

Figure 11:
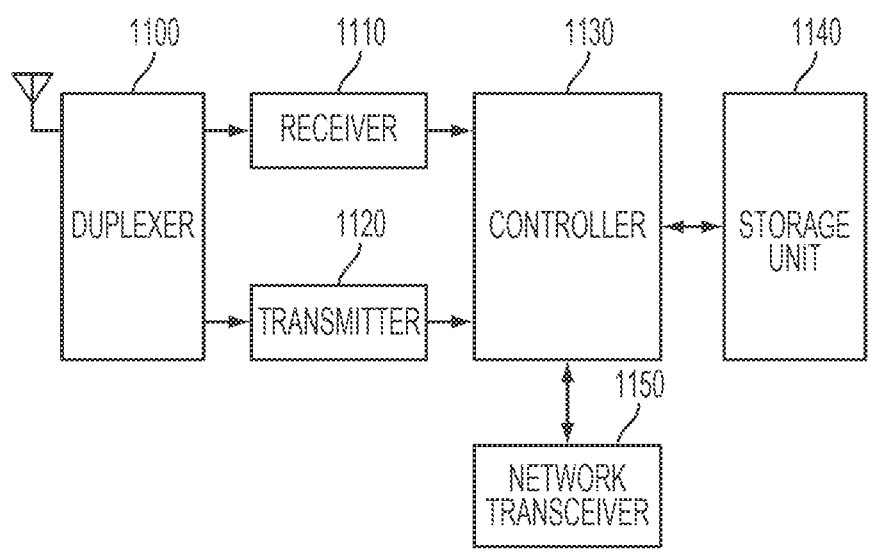
FIG. 11 is a block diagram illustrating a transmitter in a wireless communication system according to an exemplary embodiment of the present invention.

FIG. 11 is a block diagram illustrating a transmitter in a wireless communication system according to an exemplary embodiment of the present invention.

Referring to FIG. 11, the transmitter includes a duplexer 1100, a receiver 1110, a transmitter 1120, a controller 1130, a storage unit 1140, and a network transceiver 1150. The transmitter may include any number of additional structural elements. However, a description of additional structural elements of transmitter is omitted for conciseness. The transmitter may be a base station, ABS, etc.

The duplexer 1100 transmits a transmission signal provided from the transmitter 1120 via an antenna, and provides a reception signal from the antenna to the receiver 1110 according to a duplexing scheme.

The receiver 1110 receives the reception signal based on beamforming coefficients and converts the reception signal into a baseband signal and provides the baseband signal to the controller 1130. For example, when the wireless communication system uses an OFDM scheme, the receiver 1110 includes an RF processor, an ADC, an OFDM demodulator and a decoder. The RF processor converts an RF signal provided from the duplexer 1100 into a baseband analog signal. The ADC converts the analog signal provided from the RF processor into digital sample data. The OFDM demodulator converts sample data in the time domain provided from the ADC into data in the frequency domain by performing FFT. The decoder demodulates and decodes a signal provided from the OFDM demodulator according to an MCS level.

The controller 1130 controls overall operations of the transmitter. The operations of the transmitter include any of the operations explicitly or implicitly described above as being performed by a transmitter, a base station, or an ABS. In addition, the controller 1130 determines and provides beamforming coefficients to the receiver 1110 and the transmitter 1120.

The transmitter 1120 converts a transmission signal into an RF signal, processes the RF signal based on beamforming coefficients, and provides the processed RF signal to the duplexer 1100 under control of the controller 1130. For example, when the wireless communication system uses an OFDM scheme, the transmitter 1120 includes an encoder, an OFDM modulator, a Digital/Analog Converter (DAC) and an RF processor. The encoder encodes and modulates a transmission signal according to an MCS level under control of the controller 1130. The OFDM modulator converts data in the frequency domain provided from the encoder to sample data (i.e., an OFDM symbol) in the time domain by performing IFFT. The DAC converts sample data provided from the OFDM modulator into an analog signal. The RF processor converts a baseband analog signal provided from the DAC into an RF signal.

The storage unit 1140 stores programs required for overall operations of the transmitter and various data including any of the information and/or algorithms discussed herein as being received, transmitted, retained or used by an transmitter, a base station, or an ABS.

The network transceiver 1150 facilities communication with other network entities within a wireless communication system.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a transmitter station to perform beamforming in a wireless communication system, the method comprising:

estimating and tracking a long-term averaged and normalized channel correlation matrix between the transmitter station and a receiver station;

determining beamforming coefficients based on the tracked long-term averaged and normalized channel correlation matrix; and communicating with the receiver station using the determined beamforming coefficients, wherein the receiver station also estimates and tracks the long term averaged and normalized channel correlation matrix, and determines beamforming coefficients based on the tracked long-term averaged and normalized channel correlation matrix.

2. The method of claim 1, wherein the estimating and the tracking of the long-term averaged and normalized channel correlation matrix by the transmitter station is simultaneously performed with the estimating and the tracking of the long-term averaged and normalized channel correlation matrix by the receiver station.

3. The method of claim 1, wherein the determining of the beamforming coefficients based on the tracked long-term averaged and normalized channel correlation matrix, comprises:

applying the tracked long-term averaged and normalized channel correlation matrix to a base codebook to generate a transformed codebook; and determining the beamforming coefficients based on the transformed codebook, wherein the base codebook is a codebook that is predefined and known to both the transmitter station and the receiver station.

4. The method of claim 1, wherein the long-term averaged and normalized channel correlation matrix is tracked as a function of at least one of a forgetting factor, a random factor, a Channel Quality Indication (CQI) or a Signal to Interference plus Noise Ratio (SINR), reported transmit precoding indication from the receiver station that is based on a transformed codebook, a transmit precoding matrix at the transmitter station that corresponds to or is a function of the reported transmit precoding indication from the receiver station, and a complex random matrix.

5. The method of claim 1, wherein the long-term averaged and normalized channel correlation matrix is tracked using the equation:

$$\tilde{R}[t] = \alpha \tilde{R}[t-1] + (1-\alpha) w_j[t] w_j^H[t] \gamma + \beta v_{random}[t] v_{random}^H[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $w_j$ denotes a transmit precoding matrix at the transmitter station that corresponds to or is a function of reported transmit precoding indication from the receiver station, based on a transformed codebook, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$, and $v_{random}$ is a complex random matrix, which is simultaneously generated at both the transmitter station and the receiver station and is used to avoid a bias estimation of $\tilde{R}$.

6. The method of claim 1, wherein the long-term averaged and normalized channel correlation matrix is tracked as a function of at least one of a forgetting factor, a random factor, reported transmit precoding indication from the receiver station, a transmit precoding matrix at the transmitter station that corresponds to or is a function of the reported transmit precoding indication from the receiver station, based on a fixed or base codebook, a Channel Quality Indication (CQI) or a Signal to Interference plus Noise Ratio (SINR), and a complex random matrix.

7. The method of claim 1, wherein the long-term averaged and normalized channel correlation matrix is tracked using the equation:

$$\tilde{R}[t]=\alpha\tilde{R}[t-1]+(1-\alpha)p_i[t]p_i^H[t]\gamma+\beta v_{random}[t]v_{random}^H[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $p_i$ denotes a transmit precoding matrix at the transmitter station that corresponds to or is a function of reported transmit precoding indication from the receiver station, based on a fixed or base codebook P, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$, and $v_{random}$ is a complex random matrix, which is simultaneously generated at both the transmitter station and the receiver station and is used to avoid a bias estimation of $\tilde{R}$.

8. A method for a receiver station to perform beamforming in a wireless communication system, the method comprising:
estimating and tracking a long-term averaged and normalized channel correlation matrix between the receiver station and a transmitter station;
determining beamforming coefficients based on the tracked long-term averaged and normalized channel correlation matrix; and
communicating with the transmitter station using the determined beamforming coefficients,
wherein the transmitter station also estimates and tracks the long term averaged and normalized channel correlation matrix, and determines beamforming coefficients based on the tracked long-term averaged and normalized channel correlation matrix.

9. The method of claim 8, wherein the estimating and the tracking of the long-term averaged and normalized channel correlation matrix by the receiver station is simultaneously performed with the estimating and the tracking of the long-term averaged and normalized channel correlation matrix by the transmitter station.

10. The method of claim 8, wherein the determining of the beamforming coefficients based on the tracked long-term averaged and normalized channel correlation matrix, comprises:

applying the tracked long-term averaged and normalized channel correlation matrix to a base codebook to generate a transformed codebook; and
determining the beamforming coefficients based on the transformed codebook,
wherein the base codebook is a codebook that is predefined and known to both the receiver station and the transmitter station.

11. The method of claim 8, wherein the long-term averaged and normalized channel correlation matrix is tracked as a function of at least one of a forgetting factor, a random factor, a Channel Quality Indication (CQI) or a Signal to Interference plus Noise Ratio (SINR), reported transmit precoding indication from the receiver station that is based on a transformed codebook, a transmit precoding matrix at the transmitter station which corresponds to or is a function of the reported transmit precoding indication from the receiver station, and a complex random matrix.

12. The method of claim 8, wherein the long-term averaged and normalized channel correlation matrix is tracked using the equation:

$$\tilde{R}[t]=\alpha\tilde{R}[t-1]+(1-\alpha)w_j[t]w_j^H[t]\gamma+\beta v_{random}[t]v_{random}^H[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $w_j$ denotes a transmit precoding matrix at the transmitter station that corresponds to or is a function of reported transmit precoding indication from the receiver station, based on a transformed codebook, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$, and $v_{random}$ is a complex random matrix, which is simultaneously generated at both the transmitter station and the receiver station and is used to avoid a bias estimation of $\tilde{R}$.

13. The method of claim 8, wherein the long-term averaged and normalized channel correlation matrix is tracked as a function of at least one of a forgetting factor, a random factor, reported transmit precoding indication from the receiver station, a transmit precoding matrix at the transmitter station that corresponds to or is a function of the reported transmit precoding indication from the receiver station, based on a fixed or base codebook, a Channel Quality Indication (CQI) or a Signal to Interference plus Noise Ratio (SINR), and a complex random matrix.

14. The method of claim 8, wherein the long-term averaged and normalized channel correlation matrix is tracked using the equation:

$$\tilde{R}[t]=\alpha\tilde{R}[t-1]+(1-\alpha)p_i[t]p_i^H[t]\gamma+\beta v_{random}[t]v_{random}^H[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $p_i$ denotes a transmit precoding matrix at the transmitter station that corresponds to or is a function of reported transmit precoding indication from the receiver station, based on a fixed or base codebook P, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$, and $v_{random}$ is a complex random matrix, which is simultaneously generated at both the transmitter station and the receiver station and is used to avoid a bias estimation of $\tilde{R}$.

15. A transmitter station for performing beamforming in a wireless communication system, the transmitter station comprising:

a receiver for receiving signals from a receiver station based on beamforming coefficients;

a transmitter for transmitting signals to the receiver station based on beamforming coefficients; and a controller for estimating and tracking a long-term averaged and normalized channel correlation matrix between the transmitter station and the receiver station, for determining beamforming coefficients based on the tracked long-term averaged and normalized channel correlation matrix, for controlling the receiver to receive signals from the receiver station using the determined beamforming coefficients, and for controlling the transmitter to transmit signals to the receiver station using the determined beamforming coefficients, wherein the receiver station also estimates and tracks the long term averaged and normalized channel correlation matrix, and determines beamforming coefficients based on the tracked long-term averaged and normalized channel correlation matrix.

16. The transmitter station of claim 15, wherein the estimating and the tracking of the long-term averaged and normalized channel correlation matrix by the transmitter station is simultaneously performed with the estimating and the tracking of the long-term averaged and normalized channel correlation matrix by the receiver station.

17. The transmitter station of claim 15, wherein the controller, when determining the beamforming coefficients based on the tracked long-term averaged and normalized channel correlation matrix, applies the tracked long-term averaged and normalized channel correlation matrix to a base codebook to generate a transformed codebook, and determines the beamforming coefficients based on the transformed codebook, wherein the base codebook is a codebook that is predefined and known to both the transmitter station and the receiver station.

18. The transmitter station of claim 15, wherein the controller tracks the long-term averaged and normalized channel correlation matrix as a function of at least one of a forgetting factor, a random factor, a Channel Quality Indication (CQI) or a Signal to Interference plus Noise Ratio (SINR), reported transmit precoding indication from the receiver station that is based on a transformed codebook, a transmit precoding matrix at the transmitter station which corresponds to or is a function of the reported transmit precoding indication from the receiver station, and a complex random matrix.

19. The transmitter station of claim 15, wherein the controller tracks the long-term averaged and normalized channel correlation matrix using the equation:

$$\tilde{R}[t]=\alpha\tilde{R}[t-1]+(1-\alpha)w_j[t]w_j^H[t]\gamma+\beta v_{random}[t]v_{random}^H[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $w_j$ denotes a transmitter precoding matrix at the transmitter station that corresponds to or is a function of reported transmit precoding indication from the receiver station, based on a transformed codebook, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$ and $v_{random}$ is a complex random matrix, which is simultaneously generated at both the transmitter station and the receiver station and is used to avoid a bias estimation of $\tilde{R}$.

20. The transmitter station of claim 15, wherein the controller tracks the long-term averaged and normalized channel correlation matrix as a function of at least one of a forgetting factor, a random factor, reported transmit precoding indication from the receiver station, a transmit precoding matrix at the transmitter station that corresponds to or is a function of the reported transmit precoding indication from the receiver station, based on a fixed or base codebook, a Channel Quality Indication (CQI) or a Signal to Interference plus Noise Ratio (SINR), and a complex random matrix.

21. The transmitter station of claim 15, wherein the controller tracks the long-term averaged and normalized channel correlation matrix using the equation:

$$\tilde{R}[t]=\alpha\tilde{R}[t-1]+(1-\alpha)p_i[t]p_i^H[t]\gamma+\beta v_{random}[t]v_{random}[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $p_i$ denotes a transmit precoding matrix at the transmitter station that corresponds to or is a function of reported transmit precoding indication from the receiver station, based on a fixed or base codebook P, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$, and $v_{random}$ is a complex random matrix, which is simultaneously generated at both the transmitter station and the receiver station and is used to avoid a bias estimation of $\tilde{R}$.

22. A receiver station for performing beamforming in a wireless communication system, the receiver station comprising:

a receiver for receiving signals from a transmitter station based on beamforming coefficients;

a transmitter for transmitting signals to the transmitter station based on beamforming coefficients; and a controller for estimating and tracking a long-term averaged and normalized channel correlation matrix between the receiver station and the transmitter station, for determining beamforming coefficients based on the tracked long-term averaged and normalized channel correlation matrix, for controlling the receiver to receive signals from the transmitter station using the determined beamforming coefficients, and for controlling the transmitter to transmit signals to the transmitter station using the determined beamforming coefficients, wherein the transmitter station also estimates and tracks the long term averaged and normalized channel correlation matrix, and determines beamforming coefficients based on the tracked long-term averaged and normalized channel correlation matrix.

23. The receiver station of claim 22, wherein the estimating and the tracking of the long-term averaged and normalized channel correlation matrix by the receiver station is simultaneously performed with the estimating and the tracking of the long-term averaged and normalized channel correlation matrix by the transmitter station.

24. The receiver station of claim 22, wherein the controller, when determining the beamforming coefficients based on the tracked long-term averaged and normalized channel correlation matrix, applies the tracked long-term averaged and normalized channel correlation matrix to a base codebook to generate a transformed codebook, and determines the beamforming coefficients based on the transformed codebook,
wherein the base codebook is a codebook that is predefined and known to both the receiver station and the transmitter station.

25. The receiver station of claim 22, wherein the controller tracks the long-term averaged and normalized channel correlation matrix as a function of at least one of a forgetting factor, a random factor, a Channel Quality Indication (CQI) or a Signal to Interference plus Noise Ratio (SINR), reported transmit precoding indication from the receiver station that is based on a transformed codebook, a transmit precoding matrix at the transmitter that corresponds to or is a function of the reported transmit precoding indication from the receiver station, and a complex random matrix.

26. The receiver station of claim 22, wherein the controller tracks the long-term averaged and normalized channel correlation matrix using the equation:

$$\tilde{R}[t] = \alpha \tilde{R}[t-1] + (1-\alpha) w_j[t] w_j^H[t] \gamma + \beta v_{random}[t] v_{random}^H[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $w_j$ denotes a transmit precoding matrix at the transmitter station that corresponds to or is a function of reported transmit precoding indication from the receiver station, based on a transformed codebook, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$, and $v_{random}$ is a complex random matrix, which is simultaneously generated at both the transmitter station and the receiver station and is used to avoid a bias estimation of $\tilde{R}$.

27. The receiver station of claim 22, wherein the controller tracks the long-term averaged and normalized channel correlation matrix as a function of at least one of a forgetting factor, a random factor, reported transmit precoding indication from the receiver station, a transmit precoding matrix at the transmitter station that corresponds to or is a function of the reported transmit precoding indication from the receiver station, based on a fixed or base codebook, a Channel Quality Indication (CQI) or a Signal to Interference plus Noise Ratio (SINR), and a complex random matrix.

28. The receiver station of claim 22, wherein the controller tracks the long-term averaged and normalized channel correlation matrix using the equation:

$$\tilde{R}[t] = \alpha \tilde{R}[t-1] + (1-\alpha) p_i[t] p_i^H[t] \gamma + \beta v_{random}[t] v_{random}^H[t]$$

where $\tilde{R}[t]$ denotes the long-term averaged and normalized channel correlation matrix $\tilde{R}$ at time index t, $\alpha$ denotes a forgetting factor that tracks the mobility of a mobile channel, $p_i$ denotes a transmit precoding matrix at the transmitter station that corresponds to or is a function of reported transmit precoding indication from the receiver station, based on a fixed or base codebook P, $(*)^H$ denotes a Hermitian operation, $\gamma$ denotes a parameter corresponding to one of a Signal to Interference plus Noise Ratio (SINR) or a Channel Quality Indication (CQI) value, $\beta$ denotes a random factor that is used to avoid bias estimation of $\tilde{R}$, and $v_{random}$ is a complex random matrix, which is simultaneously generated at both the transmitter station and the receiver station and is used to avoid a bias estimation of $\tilde{R}$.

* * * * *